(12) United States Patent
Forbes

(10) Patent No.: US 6,431,301 B1
(45) Date of Patent: *Aug. 13, 2002

(54) SNOW VEHICLE CONVERSION KIT

(76) Inventor: Vernal D. Forbes, 4146 Marylebone Way, Boise, ID (US) 83713

( * ) Notice: Subject to any disclaimer, the term of this patent is extended or adjusted under 35 U.S.C. 154(b) by 0 days.

This patent is subject to a terminal disclaimer.

(21) Appl. No.: 09/654,378

(22) Filed: Sep. 1, 2000

Related U.S. Application Data

(63) Continuation-in-part of application No. 09/614,416, filed on Jul. 12, 2000, which is a continuation of application No. 09/030,639, filed on Feb. 25, 1998, now Pat. No. 6,112,840.

(51) Int. Cl.[7] .......................... B62B 13/18; B62D 55/104
(52) U.S. Cl. ...................... 180/185; 180/9.21; 180/9.25; 180/9.64
(58) Field of Search ................................ 180/182, 183, 180/184, 185, 186, 190, 196, 9.21, 9.25, 9.26, 9.28, 9.3, 9.5, 9.54, 9.56, 9.62, 9.64

(56) References Cited

U.S. PATENT DOCUMENTS

| | | | |
|---|---|---|---|
| 3,667,562 A | | 6/1972 | Compton .................... 180/5 R |
| 3,682,495 A | | 8/1972 | Zaimi ....................... 280/12.14 |
| 3,719,369 A | | 3/1973 | Savage ......................... 280/28 |
| 3,787,066 A | | 1/1974 | Hautier ....................... 280/217 |
| 3,804,455 A | | 4/1974 | Gorski ....................... 296/28 J |
| 3,822,755 A | * | 7/1974 | Hine .......................... 180/5 R |
| 4,146,101 A | | 3/1979 | Plourde ....................... 180/5 R |
| 4,244,436 A | | 1/1981 | Condon et al. ............. 180/191 |
| 4,314,618 A | | 2/1982 | Tamura ....................... 180/193 |
| 4,421,193 A | | 12/1983 | Bissett ........................ 180/192 |
| 4,442,913 A | | 4/1984 | Grinde ........................ 180/190 |
| 4,488,616 A | | 12/1984 | Harris ........................ 180/185 |
| 4,502,560 A | | 3/1985 | Hisatomi .................... 180/190 |
| 4,613,006 A | * | 9/1986 | Moss et al. ................. 180/9.25 |
| 4,714,125 A | * | 12/1987 | Stacy, Jr. ..................... 180/182 |
| 4,719,983 A | | 1/1988 | Bruzzone ..................... 180/184 |
| 4,823,903 A | * | 4/1989 | Bibollet et al. ............. 180/193 |
| 4,917,207 A | * | 4/1990 | Yasui et al. ................. 180/193 |
| 5,102,153 A | | 4/1992 | Rhode ........................ 280/7.14 |
| 5,109,941 A | | 5/1992 | Thompson .................. 180/182 |
| 5,314,034 A | | 5/1994 | Chittal ......................... 180/21 |
| 5,423,559 A | | 6/1995 | Rhode ...................... 280/12.14 |

(List continued on next page.)

FOREIGN PATENT DOCUMENTS

| | | | |
|---|---|---|---|
| JP | 3-231090 | * | 10/1991 |
| JP | 6-199271 | * | 7/1994 |

OTHER PUBLICATIONS

Author unknown, "Thrown For A Loop With Honda's Motosled," The Buzz–News & Rumors, Snowgoer Magazine, Aug. 1997, p. 17.

Author unknown, "Another New Snow Scooter," Snowgoer Digest, Snowgoer Magazine, Dec. 1997, p. 30.

*Primary Examiner*—Avraham Lerner
(74) *Attorney, Agent, or Firm*—Ormiston & McKiney, PLLC

(57) ABSTRACT

A conversion kit with track and ski steering assemblies to convert a two-wheeled land vehicle such as a motorcycle or bicycle to a vehicle suitable for over-snow travel. A ski assembly mounts to the steering fork of the land vehicle in place of the front wheel. A track assembly mounts to the land vehicle in place of the rear wheel. A swing arm connects to and pivots upon the land vehicle frame and angles downward behind the frame. A track circulates a fixed path around a track carriage. The track carriage extends forward from a pivot connection with the rear of the swing arm, and pivots vertically under the swing arm in scissors-fashion. The land vehicle is suspended upon the track assembly using a single shock absorber and load-distributing bell crank. A snow compacting ramp attaches to the track carriage compresses the snow ahead of the track.

34 Claims, 24 Drawing Sheets

U.S. PATENT DOCUMENTS

| | | | |
|---|---|---|---|
| 5,433,466 A | 7/1995 | Timmer | 280/288.4 |
| 5,474,146 A * | 12/1995 | Yoshioka et al. | 180/184 |
| 5,586,614 A | 12/1996 | Kouchi et al. | 180/190 |
| 5,727,643 A | 3/1998 | Kawano et al. | 180/193 |
| 5,860,486 A | 1/1999 | Bolvin et al. | 180/193 |
| 5,904,216 A | 5/1999 | Furusawa | 180/193 |
| 5,904,217 A | 5/1999 | Furasawa | 180/193 |
| 5,947,220 A | 9/1999 | Oka et al. | 180/193 |
| 5,967,534 A | 10/1999 | Bradley, Jr. | 280/47.371 |
| 6,032,752 A | 3/2000 | Karpik et al. | 180/9.52 |
| 6,095,275 A * | 8/2000 | Shaw | 180/185 |
| 6,112,840 A * | 9/2000 | Forbes | 180/193 |
| 6,321,864 B1 * | 11/2001 | Forbes | 180/193 |

* cited by examiner

FIG. 1
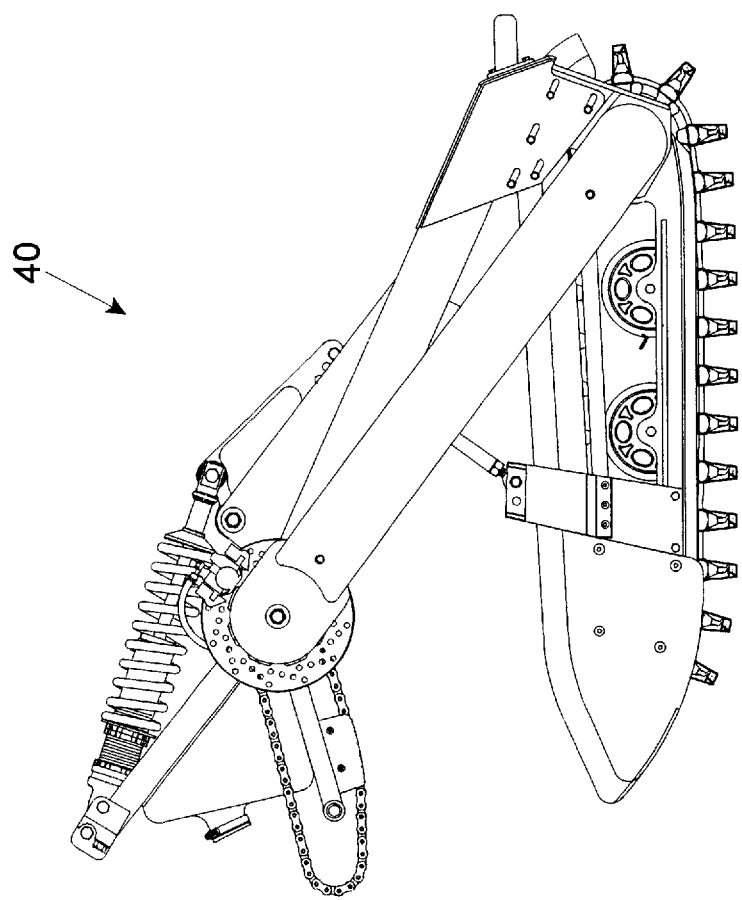
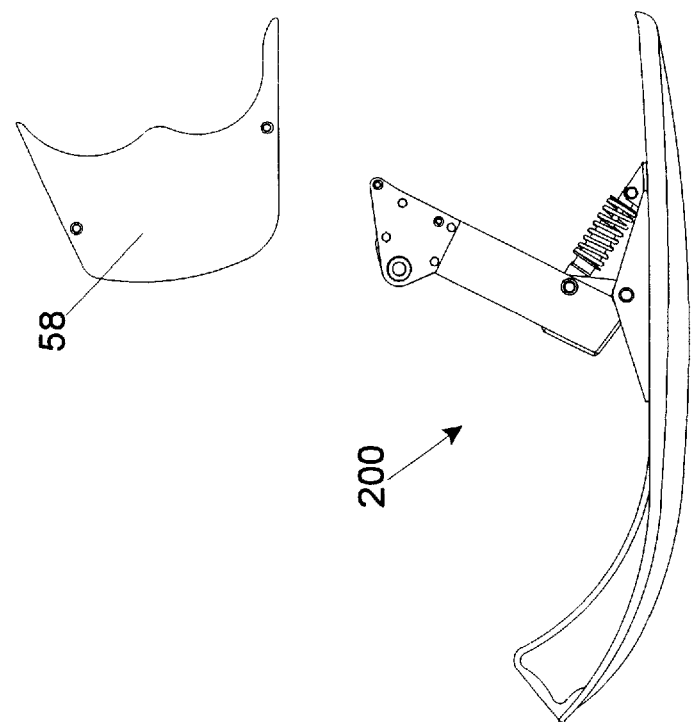

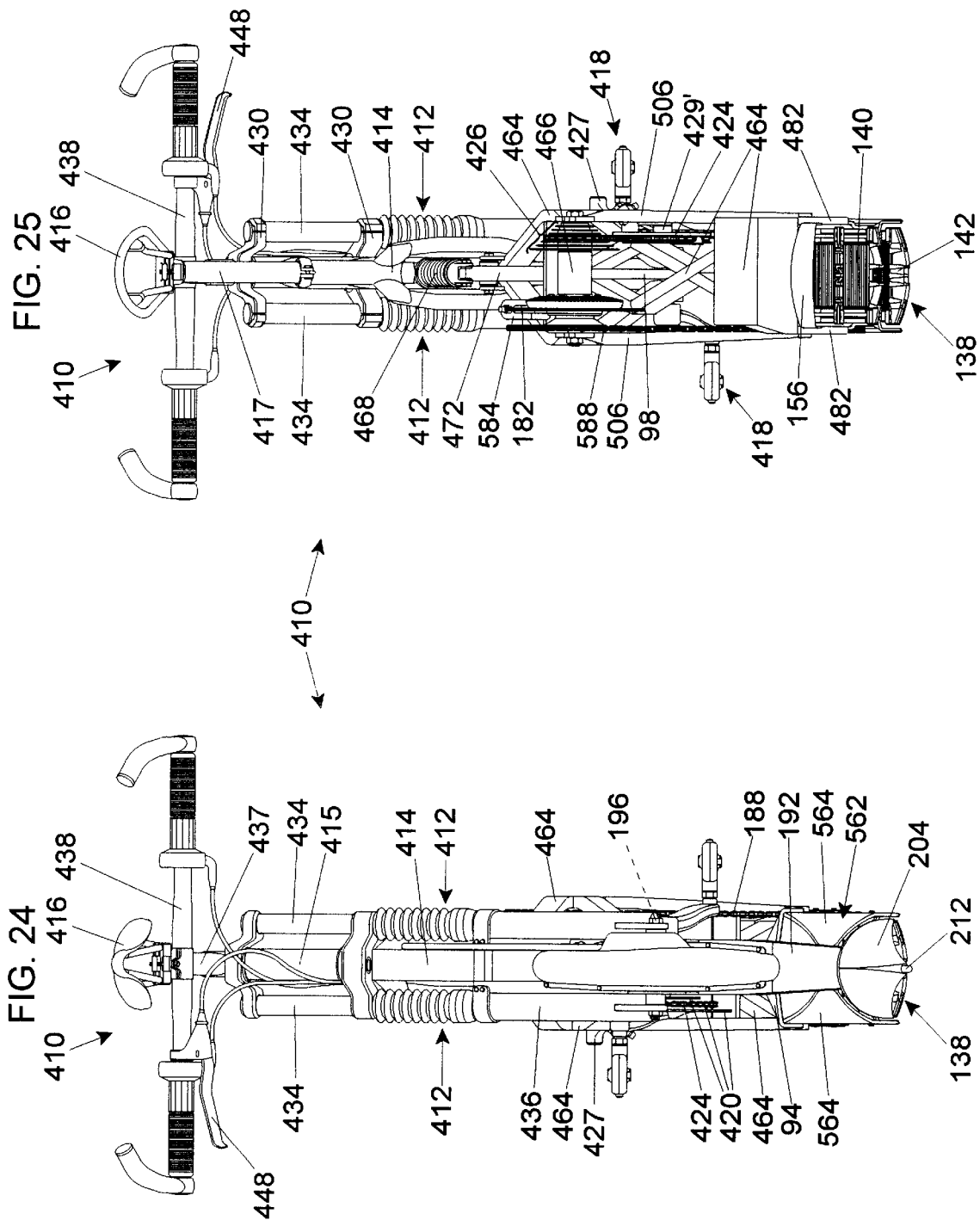

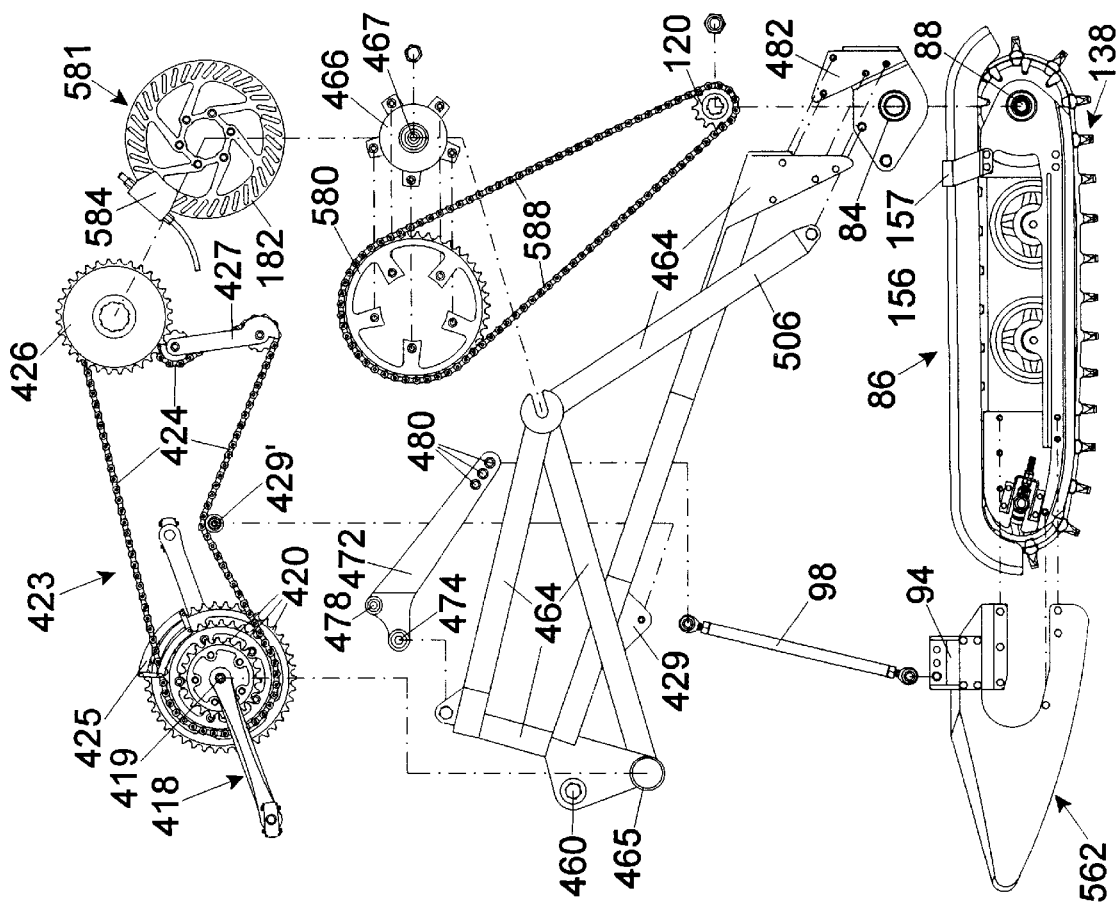
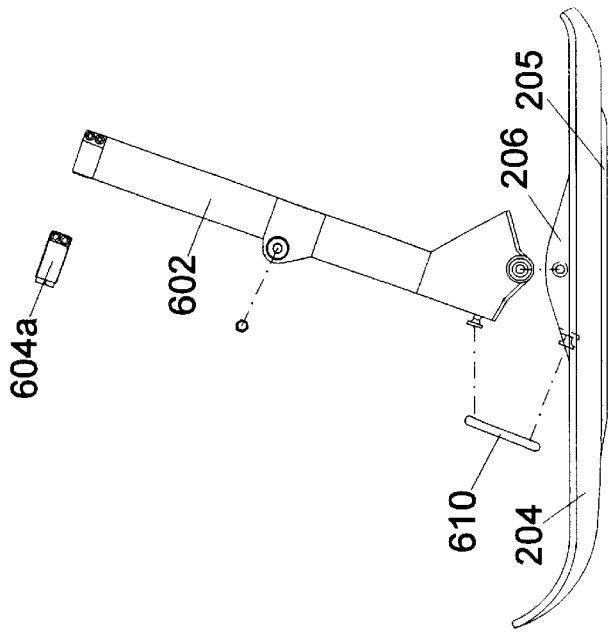
FIG. 26

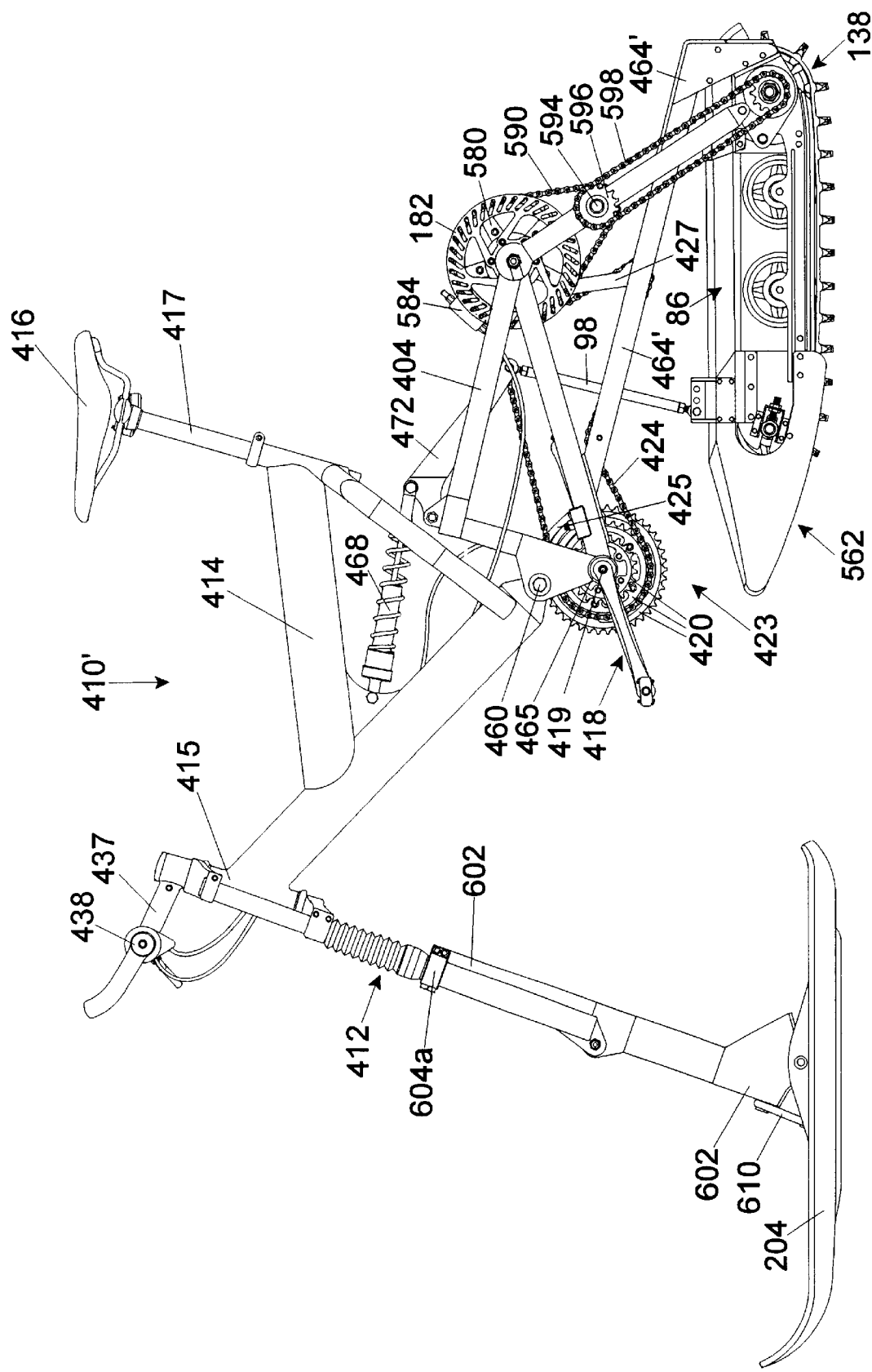

SNOW VEHICLE CONVERSION KIT

CROSS REFERENCE TO RELATED APPLICATIONS

This is a continuation-in-part of application Ser. No. 09/614,416 filed Jul. 12, 2000 which is a continuation of application Ser. No. 09/030,639 filed Feb. 25, 1998, now U.S. Pat. No. 6,112,840.

FIELD OF THE INVENTION

The invention relates generally to a snow vehicle and, more particularly, to a cycle type snow vehicle designed for banked turning, and to conversion kit assemblies used to convert a two-wheeled land vehicle such as a motorcycle or bicycle into a vehicle suited for over-snow travel.

BACKGROUND OF THE INVENTION

A variety of vehicles have been designed for travel over snow, with the well known snowmobile type being by far the most prevalent and commercially successful. Snowmobiles have evolved into highly refined and capable vehicles for travel over snow and are used predominantly for recreation. Yet, these commercially available snowmobiles exhibit a number of undesirable features and characteristics that limit their agility and versatility. They are generally quite heavy, weighing typically from 400 to 600 pounds, and require powerful motors to provide power-to-weight ratios sufficient for high performance in highly variable power-sapping snow conditions and for the wide furrows they plow through the snow. A snowmobile typically has two outboard steering skis and a relatively wide, flat track. The outrigger positioning of the skis and the wide flat track constrain the snowmobile to travel flat upon the snow and inhibit banked or leaned turning. These features also tend to limit the steepness of slope that the snowmobile can traverse, since the snowmobile can easily slide sideways when traveling across a steep slope. When cornering on hard packed snow, a snowmobile cannot be easily banked to achieve tight-radius cornering, and the operator must move his or her body far to the inside of the turn to avoid tipping or side slipping the snowmobile.

A second much less common type of snow vehicle is the snow bike or snow cycle. These vehicles are generally smaller and lighter than snowmobiles. Snow cycle designs are usually based upon off-road motorcycles or scooters with the front wheel replaced by a ski and the rear wheel replaced by an endless loop traction belt, commonly called a track. Snow cycles are vehicles designed for banked turning like a motorcycle or bicycle, and are operated "in balance". Snow cycles typically have a single steering ski and a relatively narrow track located behind and in line with the single ski. In turns, a snow cycle is leaned sideways in the direction of the turn such that the sum of gravitational and centrifugal forces acting on the vehicle and operator bears centrally on the contact areas between the snow and the ski and between the snow and the track. In this way, the snow cycle and rider remain in balance through the turn. When traversing slopes, a snow cycle maintains a vertical position such that the gravitational forces acting on the snow cycle and operator intersect the approximate center of the contact areas between the snow cycle ski and the snow and between the track and the snow.

Motor-driven snow cycles are described in U.S. Pat. Nos. 5,474,146, 4,613,006 and 4,442,913. None of these snow cycles have achieved notable commercial success. The snow cycles described in the '006 and '913 patents have minimal suspension travel between the ski and the vehicle main frame and between the track support and the main frame. The ability of their tracks to incline and decline relative to their front skis is also limited, reducing the compliance of their tracks to varying terrain and limiting traction. While the snow cycle described in the '146 patent exhibits improved suspension travel and traction over the earlier snow cycles, it does so by using a track carriage that extends rearward from the snow cycle, making the snow cycle longer than the snow cycles referenced in the '006 and '913 patents. Positioning the track so far rearward from the snow cycle center of gravity limits the braking effectiveness of the track for slowing and stopping the snow cycle.

Human powered snow cycles or "snow bicycles" are also banking snow vehicles. In snow bicycles, a single ski in front and an endless-loop track in back replace the bicycle wheels. Drive power from the operator's legs is transferred from a pedal crank through a chain and sprocket drive train to the track. Snow bicycles are described in U.S. Pat. Nos. 5,423,559 and 5,102,153. The vehicles described in these patents exhibit all of the same limitations as conventional motor driven snow cycles. In addition, the absence of shock absorbers or some other type of suspension between the tracks and the frames of these snow bicycles limits traction and results in an uncomfortable ride over rough terrain.

Many conversion kit snow vehicles have been conceived that allow a motorcycle or motor scooter to be adapted to over-snow use by removing the wheels and attaching one or more skis in place of the front wheel and one or more tracks in place of the rear wheel. The tracks of these converted vehicles are driven from the engine and transmission of the motorcycle or motor scooter. Some of these converted snow vehicles use two side-by-side tracks outboard of the sides of the motorcycle, and ride flat upon the surface of the snow, with the motorcycle frame remaining perpendicular to the surface of the snow. Examples of this type of conversion kit snow vehicle are described in U.S. Pat. Nos. 3,667,562 and 3,822,755. These converted snow vehicles are generally quite heavy with very limited cushioned suspension travel between their frames and their tracks. The outrigger positioning of their dual tracks constrain the converted snow vehicle to travel with both tracks flat upon the snow, and prevent leaning of the vehicle in turns as can be done with a snow cycle. Conversion kits for converting a motorcycle or motor scooter for over snow use as a banking snow cycle have been described in U.S. Pat. Nos. 4,488,616 and 4,719,983. These conversion kits comprise small track carriages that are attached to the motorcycle or motor scooter frames and located below the rear wheels. Their track belts encircle the track carriages and the rear wheel of the motorcycle or motor scooter engages separate wheels or gears that, in turn, engage the outer surface of the upper run of the track to propel the converted snow vehicle. These conversion kits add significant weight to the host motorcycle or motor scooter. The track carriage of the conversion kit described in U.S. Pat. No. 4,719,983 mounts at its forward end directly to the frame of the motor scooter, preventing cushioning between the track carriage and the motor scooter frame. None of these conversion kits have achieved any notable commercial success.

SUMMARY OF THE INVENTION

The present invention is directed to a kit of component assemblies that in combination with a motorcycle chassis and engine form a cycle type snow vehicle that offers improved agility and maneuverability in snow conditions ranging from powder snow to hard packed snow and ice and over varying terrain topography. The converted snow cycle is designed to emulate the steering and balancing characteristics of motorcycles and bicycles to make the converted snow cycle easier and more natural for the operator to ride and control. Unlike conventional snow cycles that deliver power to the front of the track, the conversion kit-adapted snow cycle of the present invention delivers power to the back of the track. The track extends forward from the track drive wheel to position the track substantially under the snow cycle for improved propulsion and braking traction. The scissors-type configuration of the swing arm and track also helps reduce the overall length of the snow cycle. A novel track carriage suspension improves tractional compliance of the track to the snow surface over varying terrain topography. The track design utilizes a flat belt to enhance edging and support in soft snow. Traction paddles that are quite stiff with paddle tips having laterally convex curvature are deployed to allow the snow cycle to be easily leaned or banked on hard packed snow or ice.

The snow vehicle conversion kit of the present invention includes a track assembly that includes a suspension arm, a track carriage, and a power drive train. It also includes a ski steering member having an upper portion configured for attachment to the front fork of the host motorcycle or bicycle and a lower portion mounting a ski. The forward portion of the track assembly suspension arm is configured to be adaptively mounted to the motorcycle or bicycle frame. The rearward portion of the track carriage is mounted to the rearward end of the arm. A rotatable drive wheel is mounted to the rearward portion of the track carriage. The track is coupled to and extends forward from the drive wheel and circulates in a fixed path around the track carriage. In the motorcycle conversion kit embodiment, the track assembly includes a power drive train to couple the motorcycle motor to the drive wheel to drive the track and propel the vehicle over the snow. In the bicycle conversion kit embodiment, the conversion kit track assembly includes a power drive train for coupling the bicycle's pedal crank to the drive wheel for human-powered propulsion of the converted bicycle over the snow.

In one embodiment of both the motorcycle conversion kit track assembly and the bicycle conversion kit track assembly, the track suspension arm is a swing arm that is configured to form a pivotal hinge attachment at its forward end to the main frame of the motorcycle or bicycle. The back of the track carriage is hinge mounted to the rear of the swing arm. This hinged mounting is implemented, for example, by an axle that extends between the prongs of a forked swing arm. The rear of the track carriage and the drive wheel are supported on the axle. This hinge mounting and positioning of the track carriage beneath the swing arm in a scissors-type configuration enables the track carriage to move vertically under the converted snow cycle, and allows the track carriage to incline and decline to follow the snow surface to maintain traction upon the snow. In one version of this embodiment, the combined mass of the converted snow cycle and operator is cushioned upon both the front and back of the track carriage by a single shock absorber combined with a force-distributing bell crank. The force-distributing bell crank distributes the vehicle suspension force from the shock absorber to the back of the track carriage through the swing arm and to the front of the track carriage through a connecting rod. Additionally, the bell crank can pivot to allow the track carriage to incline and decline without a change in the force exerted upon the bell crank pivot by the shock absorber.

The track assembly optionally has a snow compacting ramp is attached to the front of the track carriage positioned forward of the track and inclined upward away from the track to progressively compress the snow ahead of the track for improved traction and to prevent snow from packing in front of the track. One embodiment of the ramp assembly utilizes a ramp frame that is rigidly mounted to the track carriage frame and holds the snow ramp in a fixed attitude relative to the track carriage. A second embodiment of the snow compacting ramp has a ramp frame that attaches pivotally at its rearward end to the forward portion of the track carriage and is suspended from the motorcycle frame at its forward end. This is accomplished, for example, using a pair of swing pivot links that connect between the forward end of the ramp frame and a ramp pivot bracket that attaches to the bottom of the motorcycle frame.

DESCRIPTION OF THE DRAWINGS

FIG. 1 is a side view of one embodiment of the conversion kit assemblies for converting a motorcycle into a snow cycle.

FIG. 24 is a front view of the converted snow bicycle of FIG. 23.

FIG. 25 is a rear view of the converted snow bicycle of FIG. 23.

FIG. 26 is an exploded assembly side view of the track assembly components and the steering ski assembly components of the snow bicycle conversion kit of FIG. 22.

FIG. 29 is a side view of a snow bicycle made up of the alternate embodiment conversion kit track and steering ski assemblies of FIG. 28 mounted to the chassis of the mountain bicycle of FIG. 21.

DETAILED DESCRIPTION OF THE INVENTION

Snow Cycle Conversion Kit Structure

Figure 2:
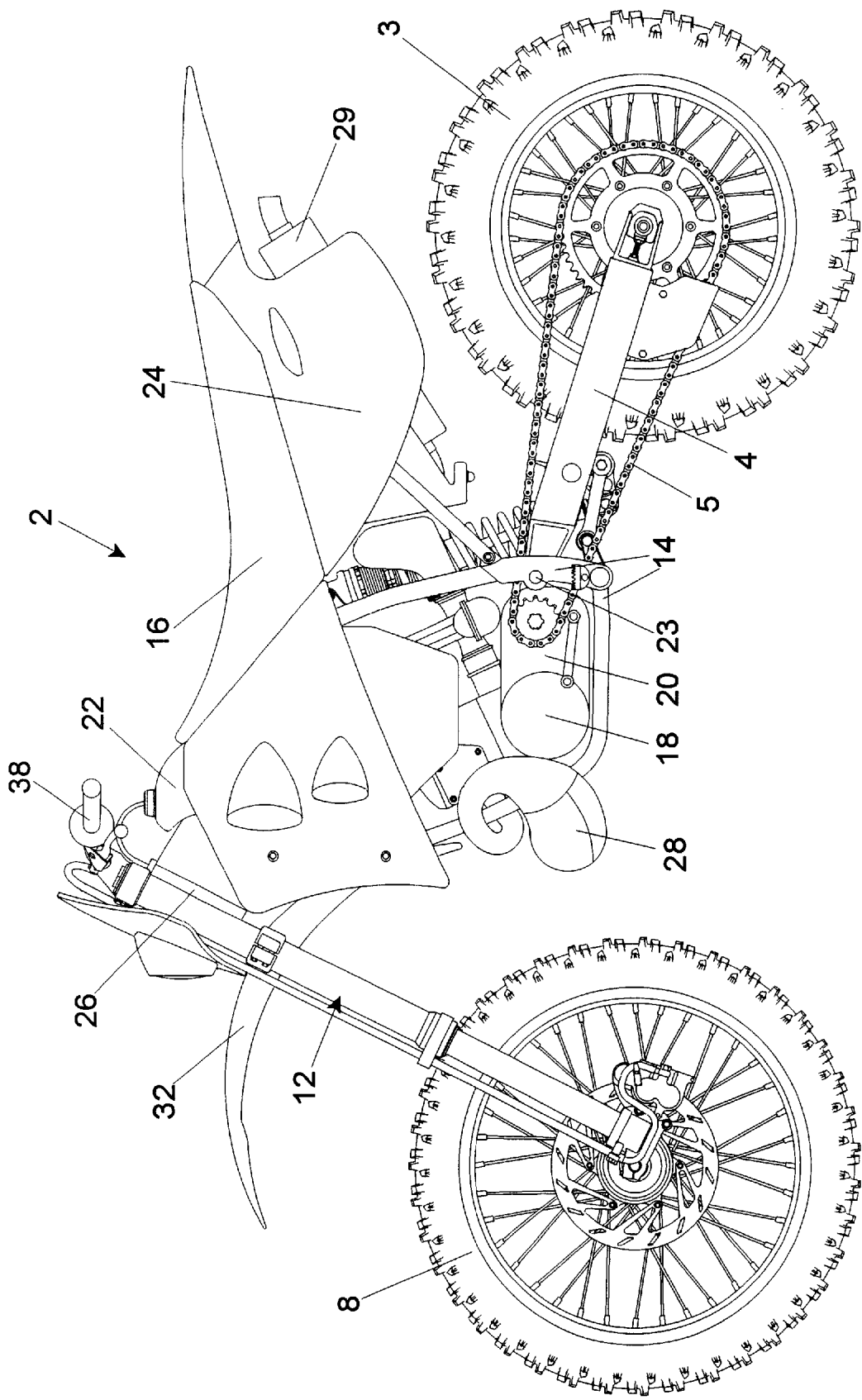
FIG. 2 is a side view of an off-road motorcycle of the type candidate for conversion using the snow cycle conversion kit of FIG. 1.
Figure 3:
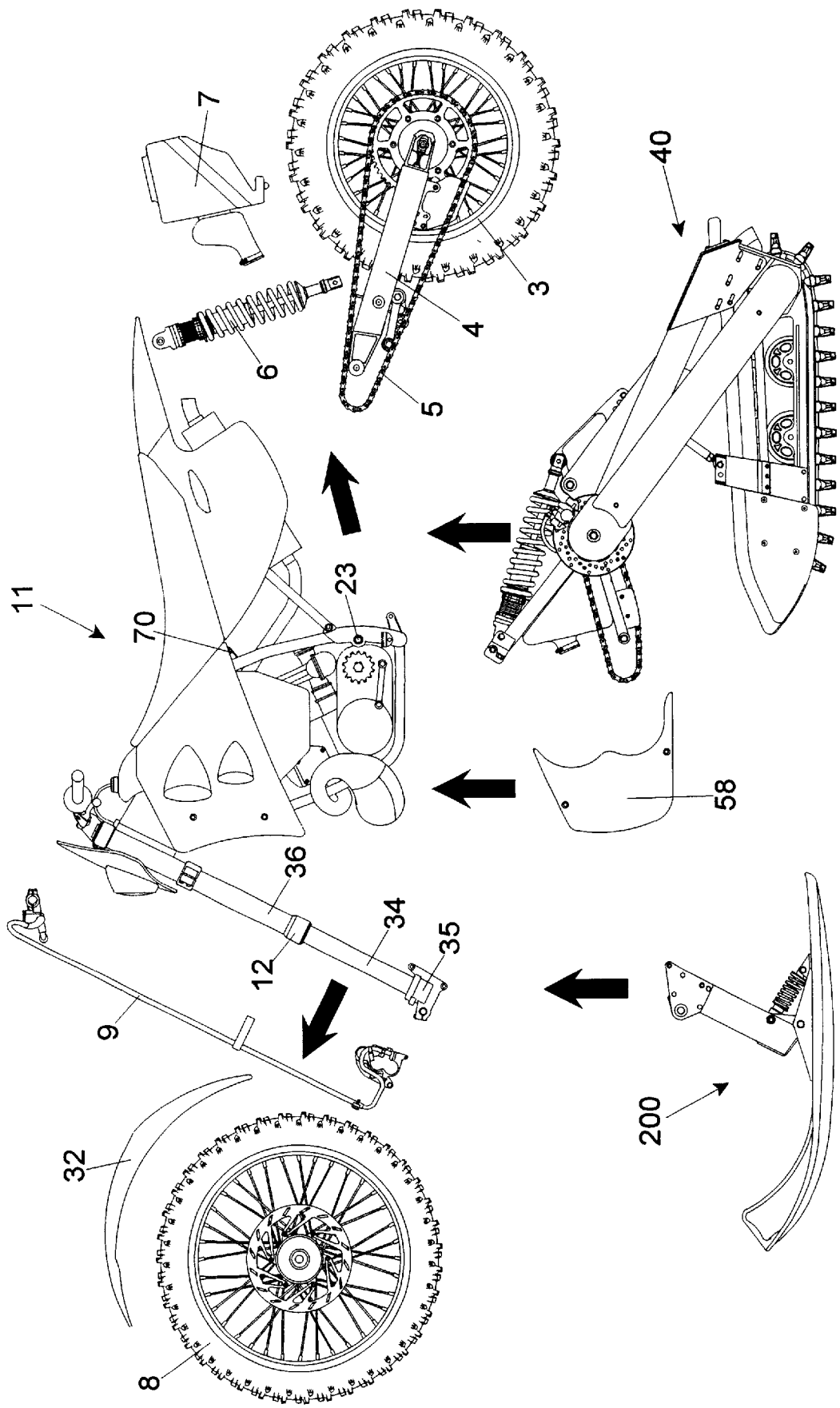
FIG. 3 is a side view of the off-road motorcycle of FIG. 2 illustrating the removal of the front and rear wheels, rear swingarm, shock absorber, air filter enclosure, front brake, and front fender, and the subsequent mounting of the conversion kit track and steering ski assemblies of FIG. 1 to the motorcycle chassis.
Figure 4:
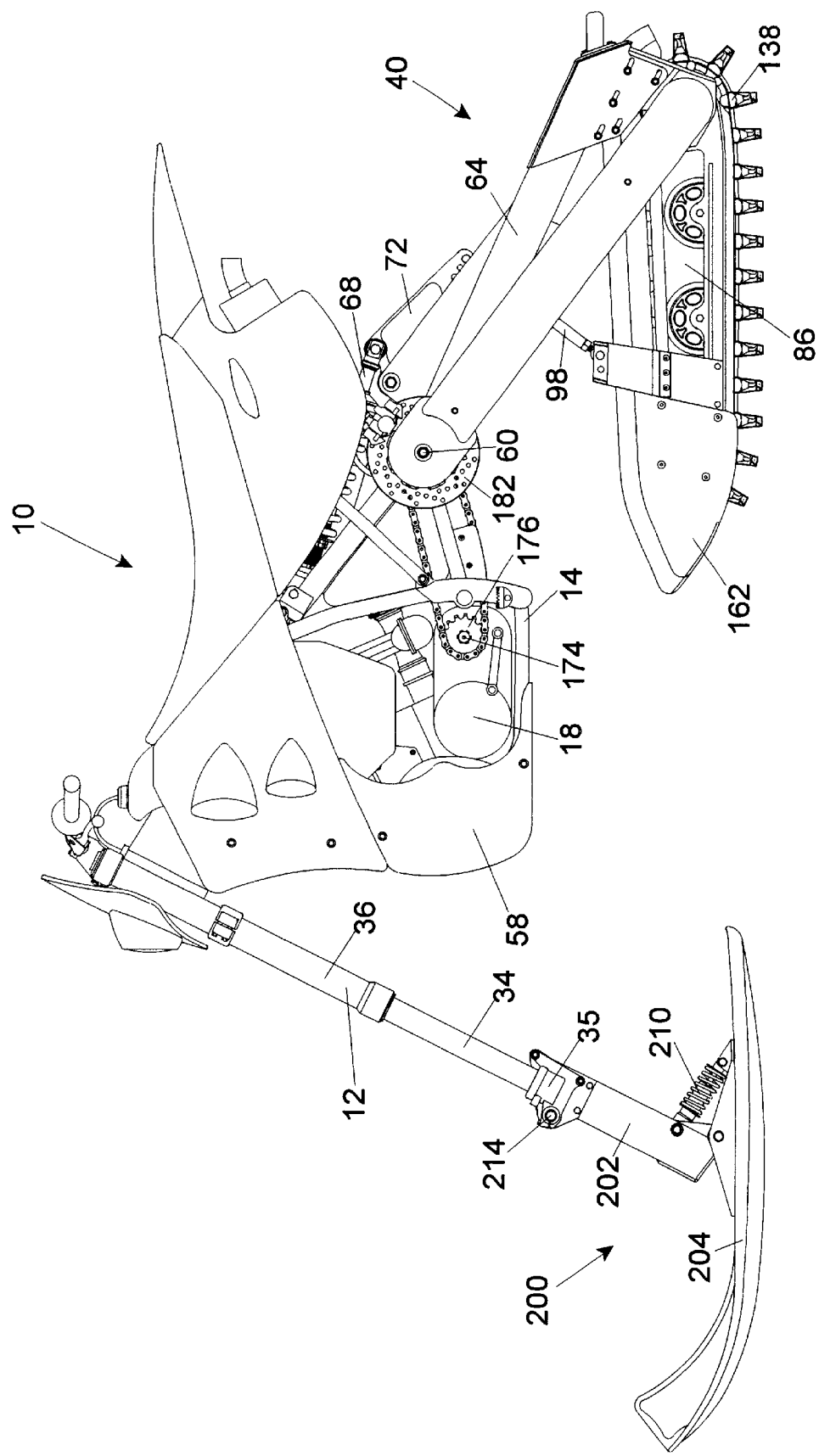
FIG. 4 is a side view of the converted snow cycle with the conversion kit track and steering ski assemblies of FIG. 1 mounted to the chassis of the off-road motorcycle of FIG. 2.

FIG. 1 illustrates from the side a track assembly 40, a steering ski assembly 200 and a snow shroud 58 that together comprise a conversion kit suitable for the seasonal conversion of any one of a variety of off-road motorcycles for over-snow use as a snow cycle. An off-road motorcycle 2 of the type suitable for seasonal conversion to snow cycle configuration is illustrated in FIG. 2. Motorcycle 2 includes a telescoping steering fork 12, a main frame 14, a saddle 16, a gasoline motor 18, a transmission 20, a fuel tank 22, a body 24, a front fender 32, a swingarm 4, a front wheel 8, a rear wheel 3, a drive roller chain 5, an exhaust pipe 28 and muffler 29, and a head tube 26. Steering fork 12 is an elongated steering member that is supported by and rotates in head tube 26. Each prong of steering fork 12 is typically constructed as a combination of telescoping upper and lower members, referred to herein as fork tubes 34 and fork sliders 36. Fork tubes 34 slide in and out of fork sliders 36. Springs and hydraulic damping mechanisms inside the fork tubes and fork sliders provide spring support and shock absorption to cushion the front end of motorcycle 2. To convert motorcycle 2 of FIG. 2 into a snow cycle, the wheels and certain other components of motorcycle 2 are removed from motorcycle 2 and the track a ski steering assemblies of the conversion kit are mounted. As illustrated in FIG. 3, rear wheel 3, swingarm 4, drive roller chain 5, a shock absorber 6, an air filter enclosure 7, front wheel 8, a front brake 9 and a front fender 32 are removed, leaving a motorcycle chassis 11 and telescoping steering fork 12. Ski steering assembly 200 is then mounted to the bottom of telescoping steering fork 12 and track assembly 40 is mounted to frame 14 of motorcycle chassis 11. A snow shroud is optionally mounted to the lower front of frame 14 to provide protection from snow and wind for the lower legs of the snow cycle operator. The resulting snow cycle 10 is illustrated in FIG. 4.

Figure 5:
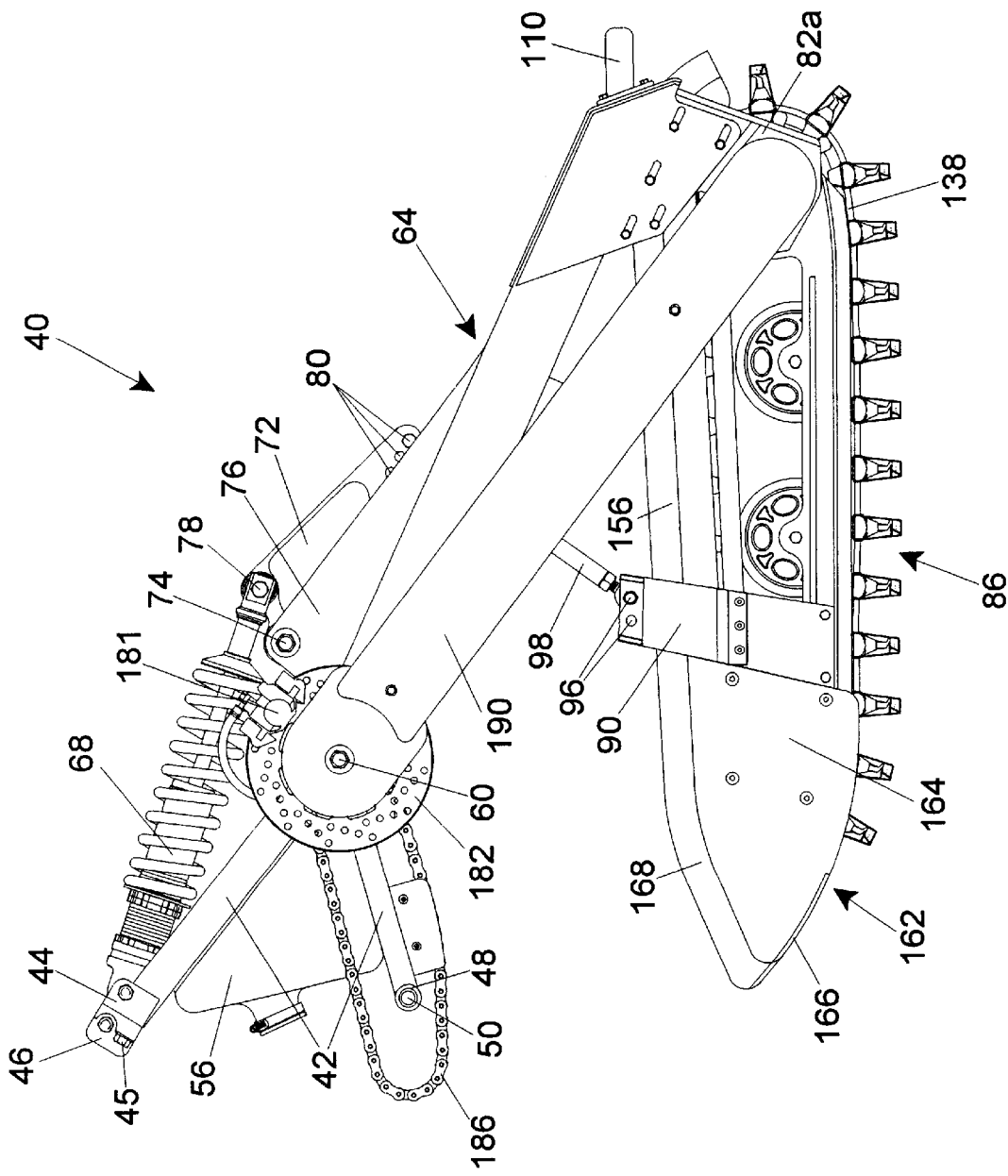
FIG. 5 is an enlarged side view of the conversion kit track assembly of FIG. 1.
Figure 6:
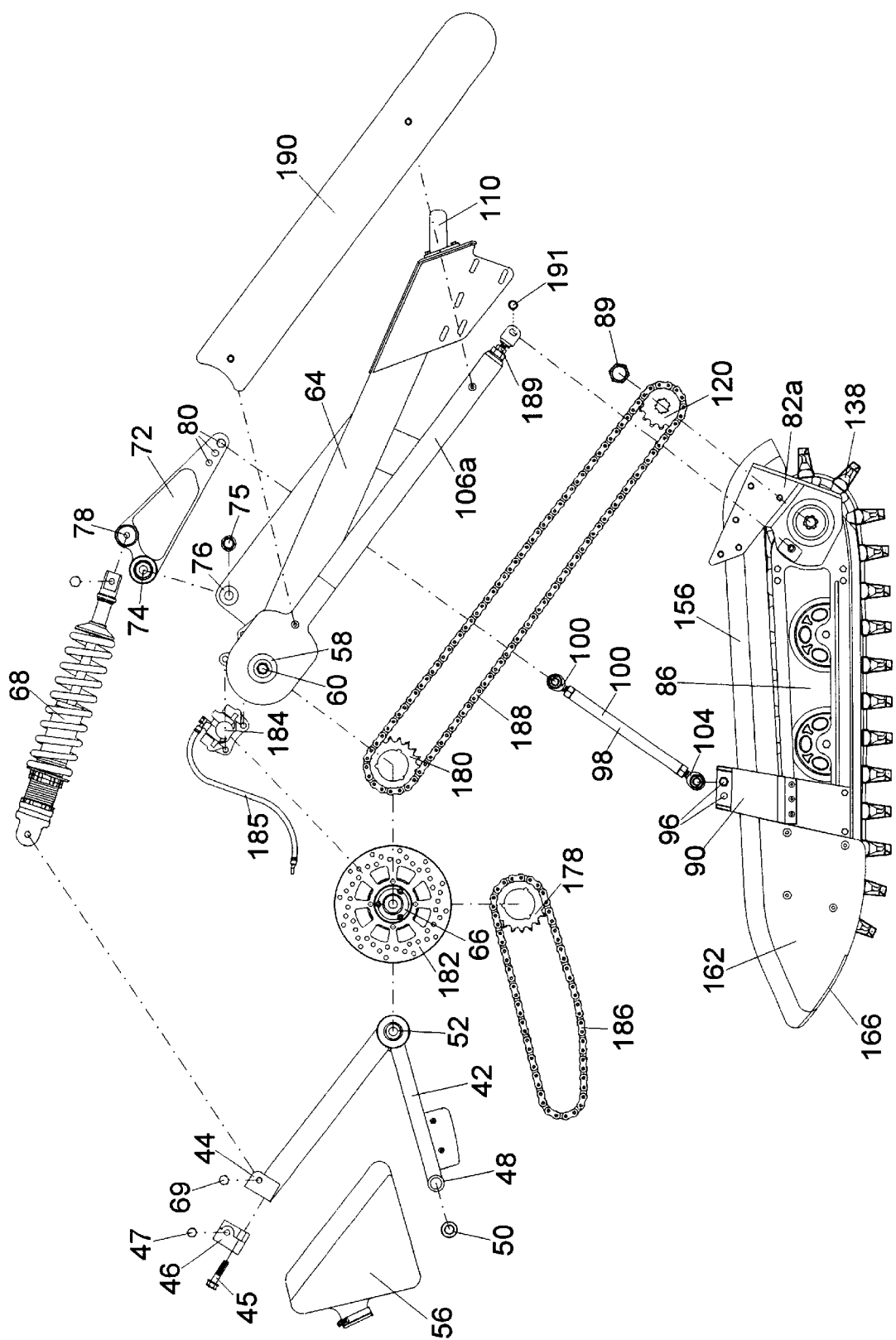
FIG. 6 is an exploded assembly side view of the track assembly of FIG. 5. This view shows the track carriage assembled and the other track assembly components separated to illustrate the assemblage of these components.

Referring now also to FIGS. 5 and 6, a swing arm pivot frame 42 is configured for adaptive rigid attachment to the rearward portion of mainframe 14 of motorcycle chassis 11. To allow the mounting of a generic swing arm pivot frame to a variety of off-road motorcycle models, special adapters are fitted to the swing arm pivot frame.

Figure 11:
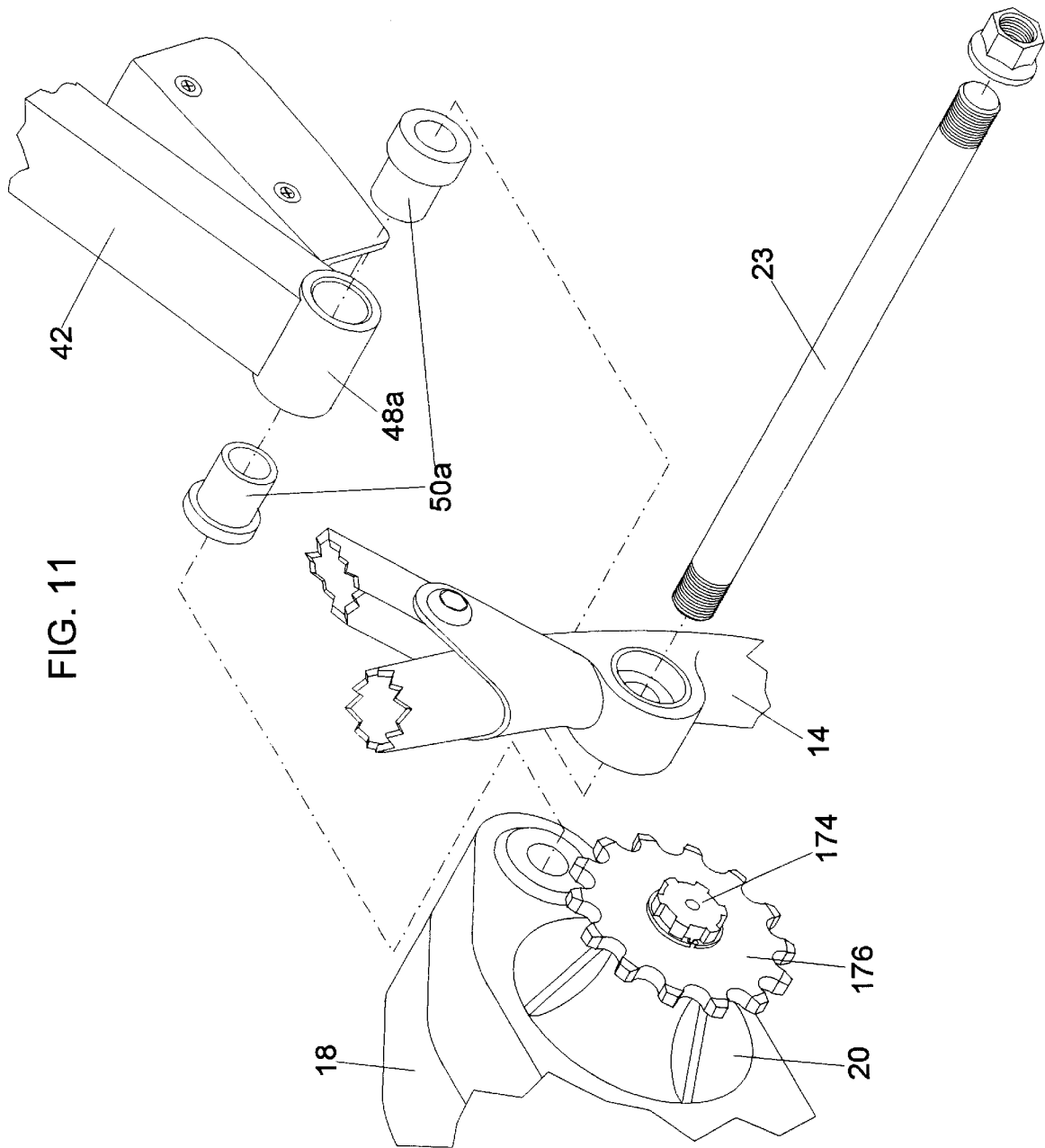
FIG. 11 is an isometric exploded assembly view of portions of the motorcycle frame and engine/transmission, the motorcycle swingarm cross-shaft, the swing arm pivot frame and pivot frame mounting adapter bushings of the conversion kit track assembly of FIGS. 1, 5 and 6.

Referring to FIG. 11, a lower left mount boss 48a receives an adapter bushing set 50a pressed into the bore of mount boss 48a from opposite sides. Adapter bushing set 50a mounts tightly between a left side member of main frame 14 and transmission 20 in the position originally occupied by swingarm 4 and locates swing arm pivot frame in correct lateral position relative to main frame 14 and motorcycle engine 18. A lower right mount boss 48b (not shown) also receives an adapter bushing set 50b (not shown) and fits tightly between transmission 20 and a right side member of motorcycle main frame 14. A motorcycle swingarm cross-shaft 23 that originally mounted motorcycle swingarm 4 in the position now occupied by pivot frame bosses 48a and 48b with adapter bushing sets 50a and 50b is inserted through a hole in the left side member of main frame 14, left side adapter bushing set 50a, transmission 20, right side adapter bushing set 50b and the right side member of main frame 14. Nuts on the ends of cross-shaft 23 secure the cross shaft and firmly clamp pivot frame 42 in position.

Figure 12:
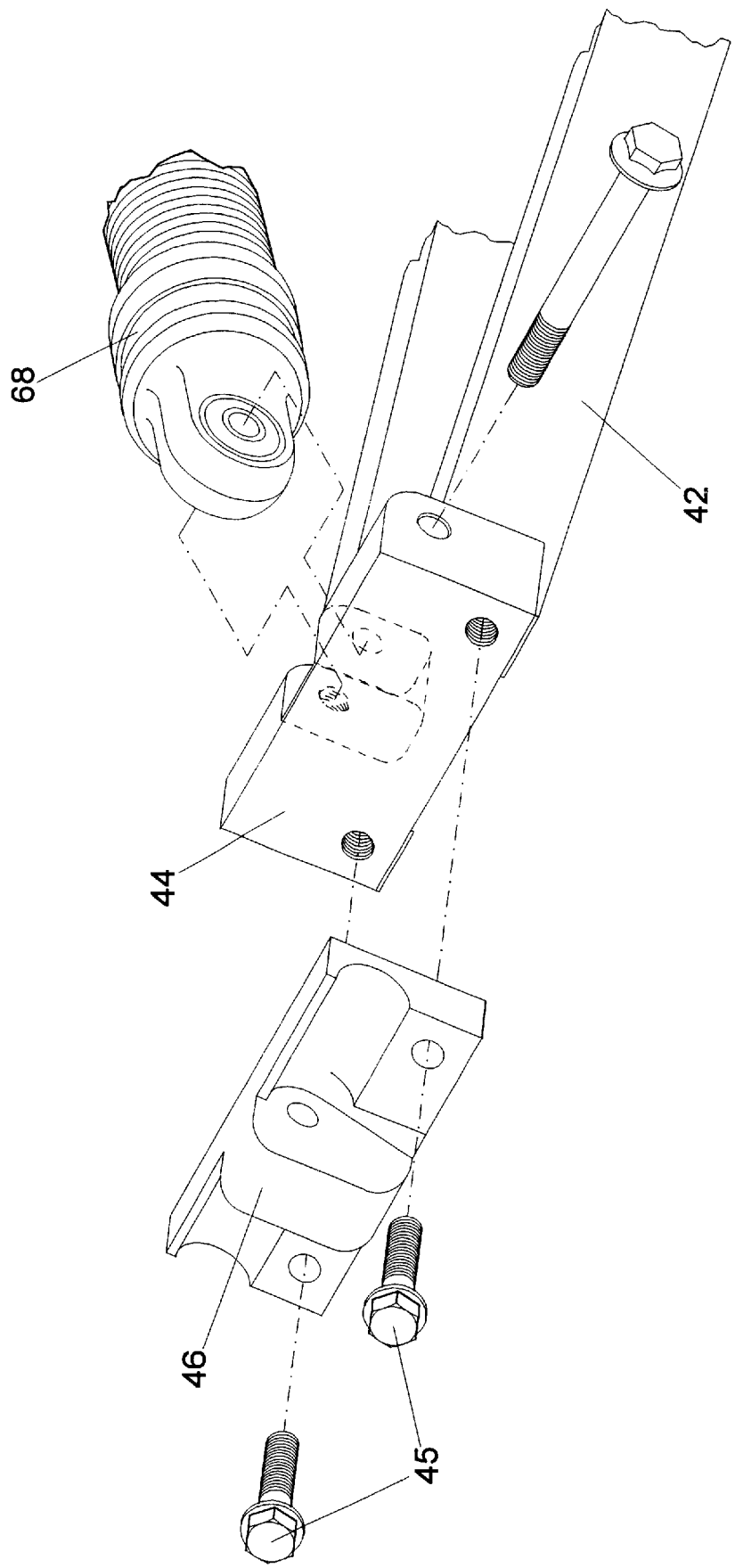
FIG. 12 is an isometric exploded assembly view of upper forward portions of the conversion kit track assembly shock absorber and swing arm pivot frame with the pivot frame upper mount adapter block.

Referring now to FIGS. 6 and 12, the upper portion of pivot frame 42 comprises an upper mount bracket 44 to which an upper mount adapter block 46 is bolted using a pair of bolts 45. Adapter block 46 mounts into the shock absorber mount of motorcycle main frame 14 in the position originally occupied by shock absorber 6, and is held in place using the shock absorber mounting bolt. In this manner, pivot frame 42 is rigidly mounted to main frame 14 in three locations and becomes a sturdy, rigid extension of main frame 14. Adapter block 46 and adapter bushing sets 50a and 50b are configured to mate generic pivot frame 42 to a specific model of motorcycle. In this manner, only the adapter block and bushing set need be manufactured in a variety of configurations to allow a single pivot frame design to be used for a conversion kit applicable to a variety of off-road motorcycle models.

Steering Ski Assembly and Front Suspension

Figure 13:
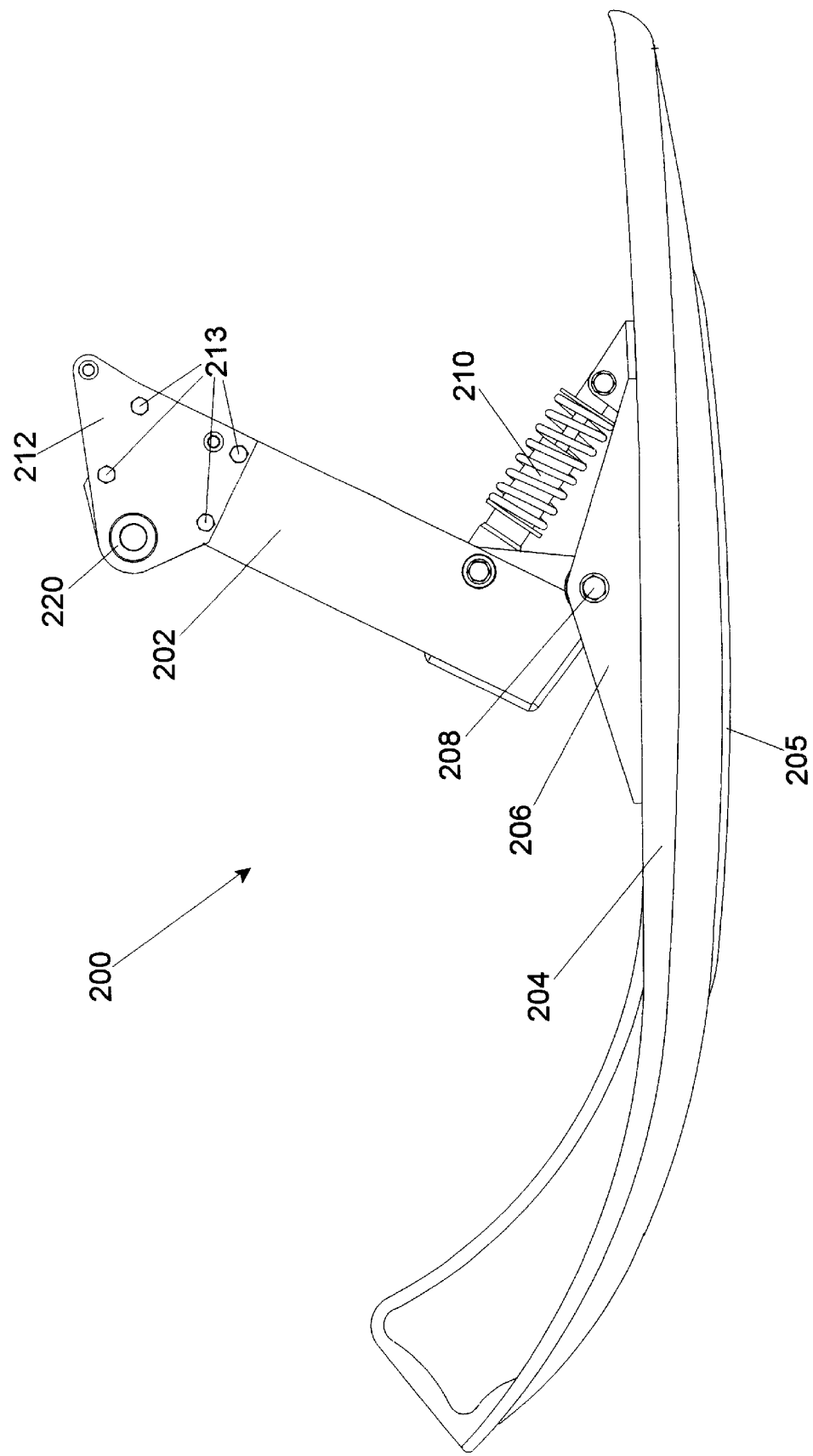
FIG. 13 is an enlarged side view of the steering ski assembly of the snow cycle conversion kit of FIG. 1.
Figure 14:
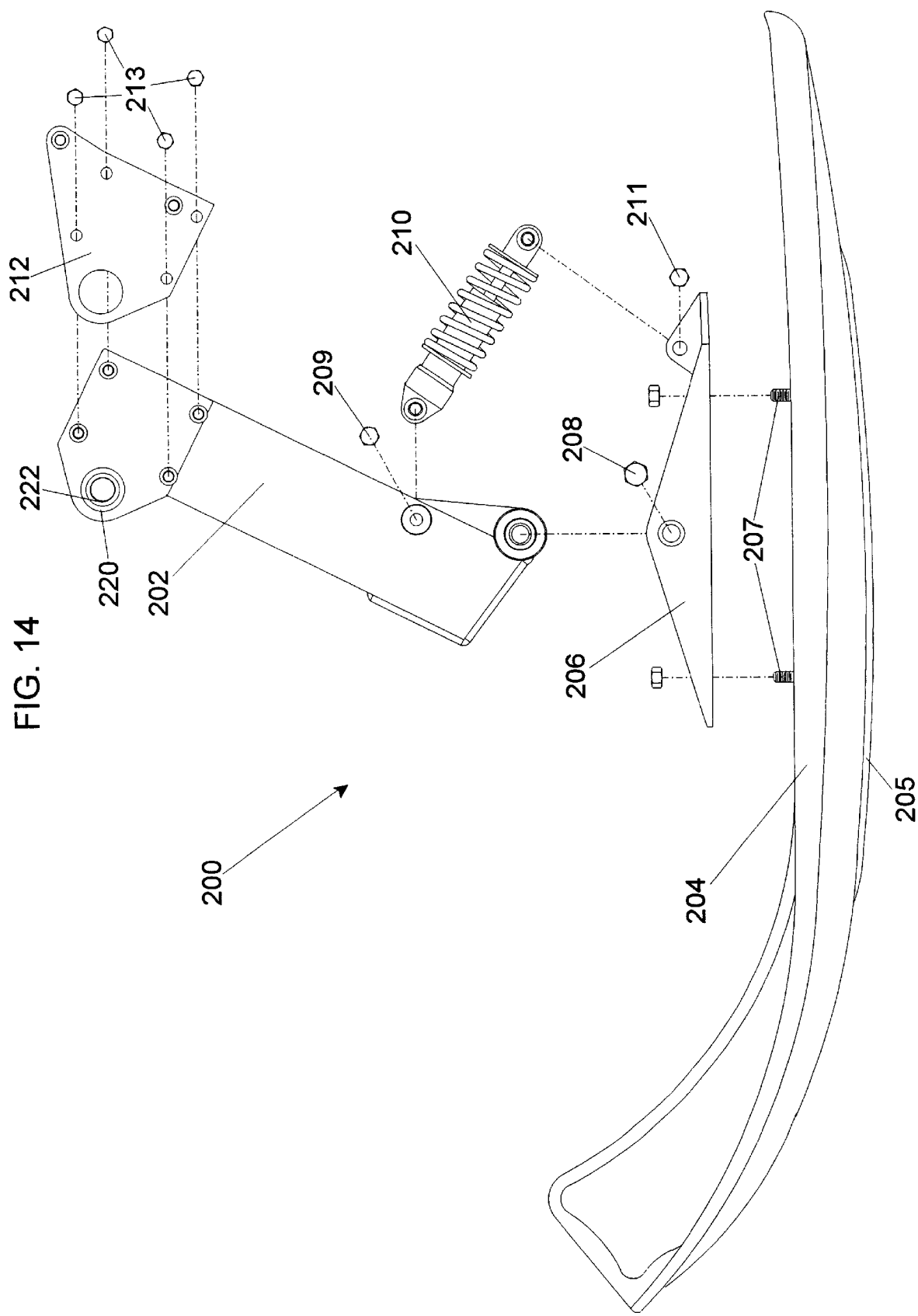
FIG. 14 is an exploded assembly side view of the steering ski assembly of FIG. 13.

Referring first to FIGS. 4, 13 and 14, ski 204 is connected to steering fork 12 through a steering extension frame 202. Extension frame 202 is mounted to the lower portion of steering fork 12. Extension frame 202 allows the use of a conventional motorcycle steering fork. A longer steering fork may be used, if desired, instead of the combined steering fork 12 and extension frame 202 shown in the drawings. Also, a monolithic elongated steering member could be substituted for steering fork 12.

Steering ski assembly 200 also has provision for adaptive mounting of a generic steering ski assembly to a variety of off-road motorcycle models by the use of motorcycle model-specific adapter components. Referring to FIGS. 13 and 14, steering ski assembly 200 is comprised of a ski 204 having a ski wear runner 205 mounted longitudinally along a central bottom portion of the ski. A ski pivot bracket 206 mounts to ski 204 with threaded studs 207 that are welded to wear runner 206 and that extend through ski 204 for attachment to pivot bracket 206. Pivot bracket 206 mounts in hinge-fashion to the lower end of an extension frame 202 using a pivot bolt 208. A Ski-biasing shock absorber 210 is pivotally mounted to the rearward end of pivot bracket 206 with a pivot bolt 211 and to extension frame 202 using a pivot bolt 209. Ski-biasing shock absorber 210 comprises a hydraulic damper and a compressive coil spring to provide both spring and damping forces between the rearward portion of ski 204 and extension frame 202. This serves to force the front end of ski 204 upward and to dampen oscillations of ski 204 around its hinge connection to extension frame 202. An axle boss 220 in the upper portion of extension frame 202 receives an axle adapter bushing 222 having an inner bore diameter sized to match the diameter of the front wheel axle of the off-road motorcycle to which the ski steering assembly is being adapted. The axle adapter bushing extends beyond the sides of axle boss 220 to sufficient width to fit precisely between left and right fork axle mounts 35 of telescoping steering fork 12. Motorcycle front axle 214 extends through left fork axle mount 35a, axle adapter bushing 222, and right fork axle mount 35b to securely clamp extension frame 202 to the lower end of steering fork 12. A motorcycle model-specific adapter plate 212 bolts to the upper left side of extension frame 202 using mounting bolts 213. Adapter plate 212 is configured to align with brake mount bosses on left fork axle mount 35a such that left fork axle mount 35a can be bolted to adapter plate 212 to prevent extension frame 202 from being forced rotationally around front axle 214 relative to steering fork 12. In this manner, steering ski assembly 200 is rigidly mounted to fork tubes 34 of steering fork 12. A single generic extension frame 202 can be optionally configured to mate with the steering fork axle mounts of a variety of off-road motorcycle models using versions of adapter plate 212 and axle adapter bushing 222 designed for the specific models of motorcycles for which they are intended.

Track Suspension, Snow Ramp and Drive Train

Referring now also to FIGS. 4–6, a swing arm pivot axle 60 mounts a swing arm 64 to a pair of swing arm pivot bosses 52 of pivot frame 42. Swing arm pivot axle 60 serves as a stationary non-rotating axle on which swing arm 64 pivots relative to pivot frame 42 and motorcycle chassis 11. An intermediate hub 66 that rotates on ball bearings is also mounted on the left portion of swing arm pivot axle 60.

Referring to FIGS. 6–9, a left track carriage pivot bracket 82a and a right track carriage pivot bracket 82b bolt to the left and right sides, respectively, of the lower rear portion of swing arm 64. Each Bracket 82a and 82b mounts a track carriage pivot bearing 84 (visible in FIG. 9). A cogwheel axle 88 extends through track carriage pivot bearings 84. A track carriage 86 pivots relative to swing arm 64 on cogwheel axle 88. Swing arm 64 also includes left and right swing arm braces 106a and 106b, respectively. Left swing arm brace 106a attaches to the left side of the forward upper end of swing arm 64 and extends back and downward to attach to left track carriage pivot bracket 82a. Right swing arm brace 106b (not visible) attaches below the forward upper end of the right side of swing arm 64 and mounts to right track carriage pivot bracket 82b. Swing arm braces 106a and 106b strengthen the combined structure comprising swing arm 64, left and right swing arm braces 106, and left and right track carriage pivot brackets 82. The combined swing arm structure comprising swing arm 64, left and right swing arm braces 106, and left and right track carriage pivot brackets 82 forms a stiff cantilever suspension arm that pivots vertically around swing arm pivot axle 60. A grab handle 110 attaches to the rear of swing arm 64 and facilitates lifting and dragging the converted snow cycle.

Referring additionally now to FIGS. 4 and 5, track carriage 86 attaches pivotably at cogwheel axle 88 to the rear of the combined swing arm structure and pivots vertically under swing arm 64. An endless-loop track 138 is carried by track carriage 86 and circulates around the periphery of the track carriage. The swing arm structure and pivot connections to track carriage 86 allow the track carriage to move scissors-fashion vertically under swing arm 64 while maintaining a level orientation, inclining, or declining to enable track 138 to maintain traction with the terrain below the snow cycle.

Figure 7:
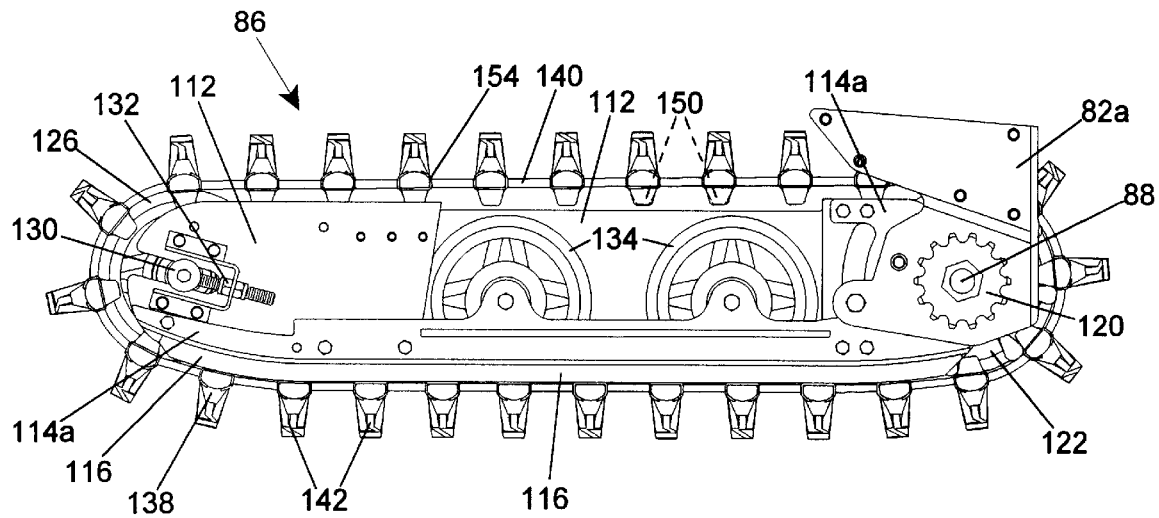
FIG. 7 is a detail side view of the track carriage and track of the conversion kit track assembly of FIG. 5. This view shows the track carriage removed from the snow cycle swing arm frame. The track shield, track carriage suspension frame and snow compacting ramp are removed, and are not shown in this view.
Figure 8:
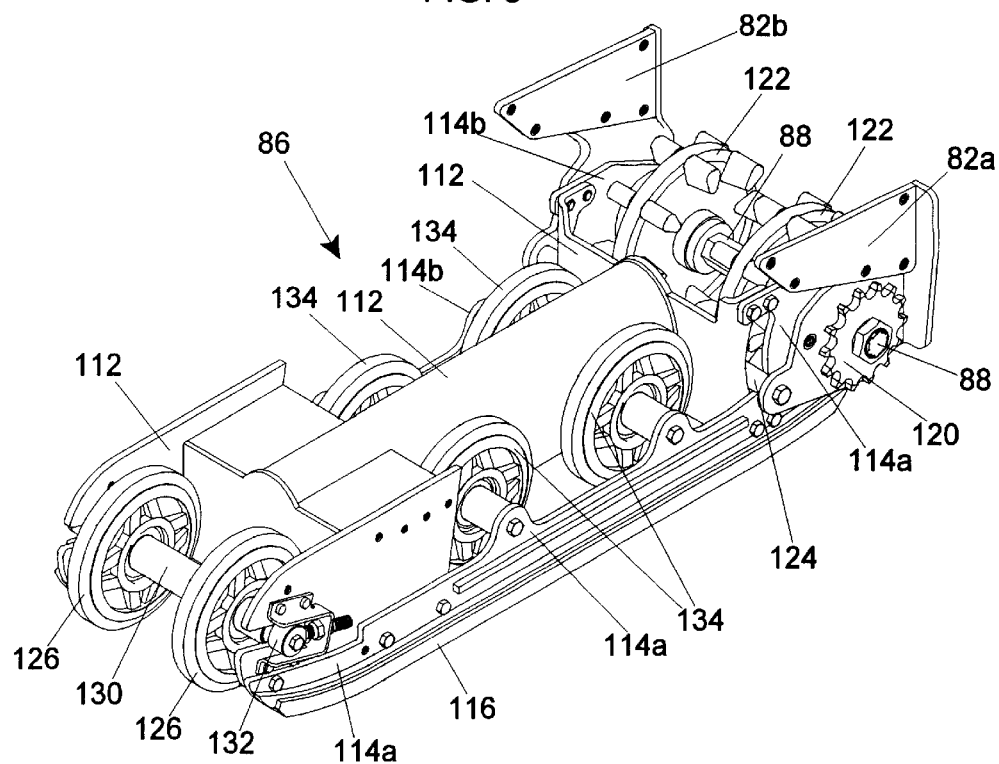
FIG. 8 is an isometric view of the track carriage of FIG. 6 with the track removed.
Figure 9:
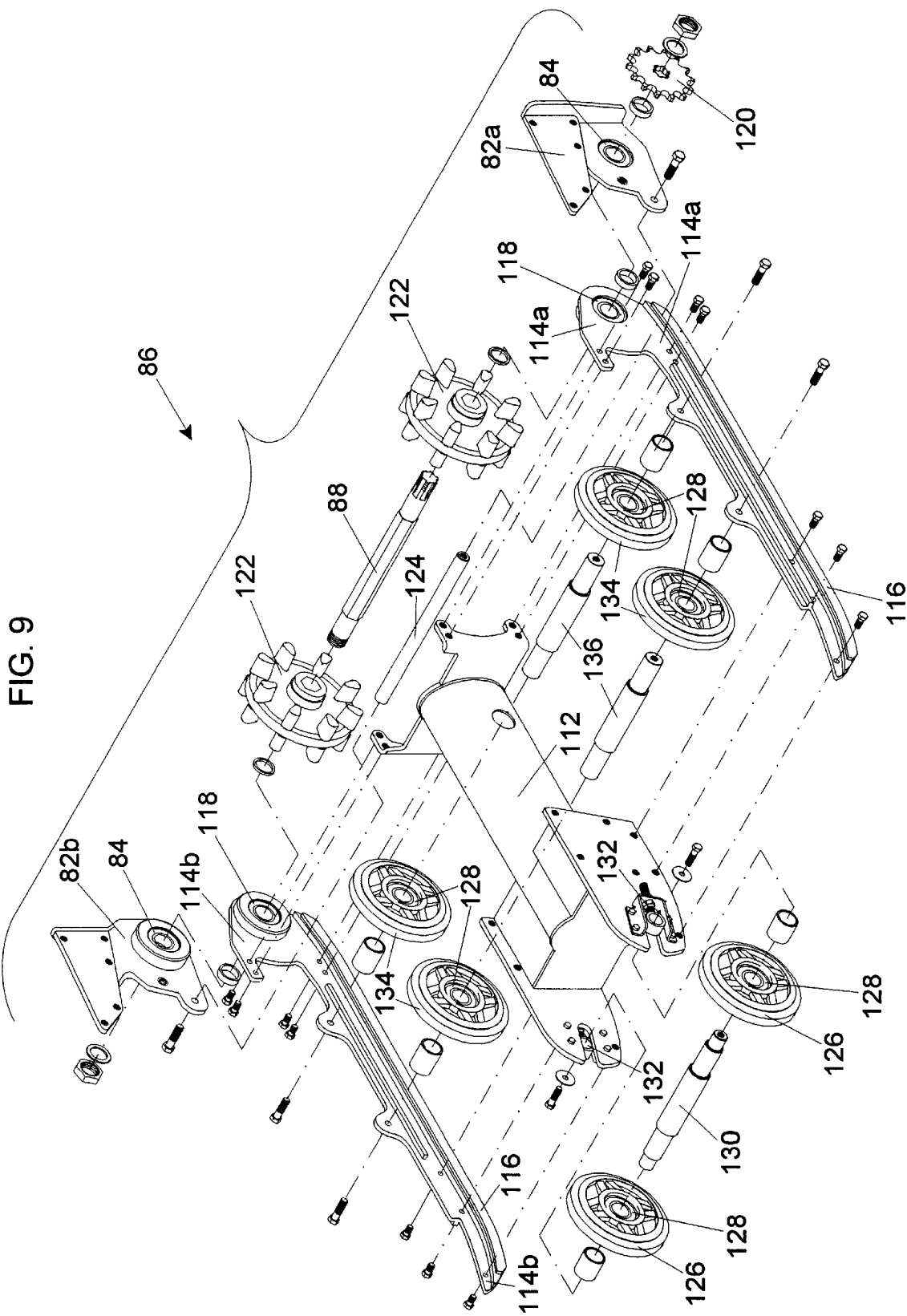
FIG. 9 is an exploded assembly view of the track carriage of FIG. 8.

The construction of track carriage 86 is illustrated in FIGS. 7–9. Track carriage 86 includes a track carriage frame 112, a left track slide rail 114a attached to the left side of track carriage frame 112, a right track slide rail 114b attached to the right side of track carriage frame 112, and a pair track slides 116 mounted along the bottoms of track slide rails 114. Track slides 116 are, preferably, manufactured from a durable high-density plastic having good friction and wear properties.

Cogwheel axle bearings 118 (visible in FIG. 9) mount in slide rails 114. Cogwheel axle 88 is supported by and rotates in cogwheel axle bearings 118 and also mounts and rotates in track carriage pivot bearings 84. This structure allows cogwheel axle 88 to function as a hinge pivot between track carriage 86 and the combined swing arm structure comprising swing arm 64, braces 106, and brackets 82. A cogwheel axle sprocket 120 is mounted to the left end of cogwheel axle 88. Two track drive wheels, called cogwheels 122, are mounted to the central portion of cogwheel axle 88.

Two guide wheels 126 are mounted to and rotate on a fixed guide wheel axle 130. Guide wheel axle 130 is mounted into left and right track tension adjusters 132 that are attached to each side of the forward portion of track carriage frame 112. The position and alignment of guide wheel axle 130 in track carriage frame 112 may be adjusted by, for example, the externally threaded rods and adjusting nuts of track tension adjustors 132 illustrated in FIGS. 6–9. Track idler wheels 134 are mounted to and rotate on fixed idler wheel axles 136. The ends of Idler wheel axles 136 are mounted to the middle portions of track slide rails 114. Rotation of guide wheels 126 and idler wheels 134 on their respective axles is facilitated by bearings 128.

As illustrated in FIGS. 5–7, track 138 circulates around track carriage frame 112, and is moveably guided and supported by drive cog wheels 122, guide wheels 126, idler wheels 134, and track slides 116. Driving and braking forces are delivered to track 138 by the engagement of cogwheels 122 with cogwheel lugs 150. Tensioning and alignment of track 138 upon track carriage 86 is accomplished by the positioning of guide wheels 126 using track tension adjusters 132.

Track 138 comprises an endless-loop belt 140 with a multitude of traction paddles 142 formed on the outer surface and a multitude of cogwheel lugs 150 formed on the inner surface. Track belt 140 is formed in an endless loop, and may be made of any flexible reinforced rubber compound like that used for conventional snowmobile tracks or other suitably strong, flexible material. Traction paddles 142 and track cogwheel lugs 150 are, preferably, also made of a strong flexible rubber compound molded to track belt 140. Traction paddles 142 extend laterally beyond the sides of track belt 140, leaving openings between the ends of adjacent traction paddles. Slide bearing clips 154 are clamped around the laterally-extending ends of traction paddles 142 to provide durable bearing and guide surfaces to bear upon track slides 116. Slide bearing clips 154 should be made of steel or some other suitably wear resistant material.

Figure 10:
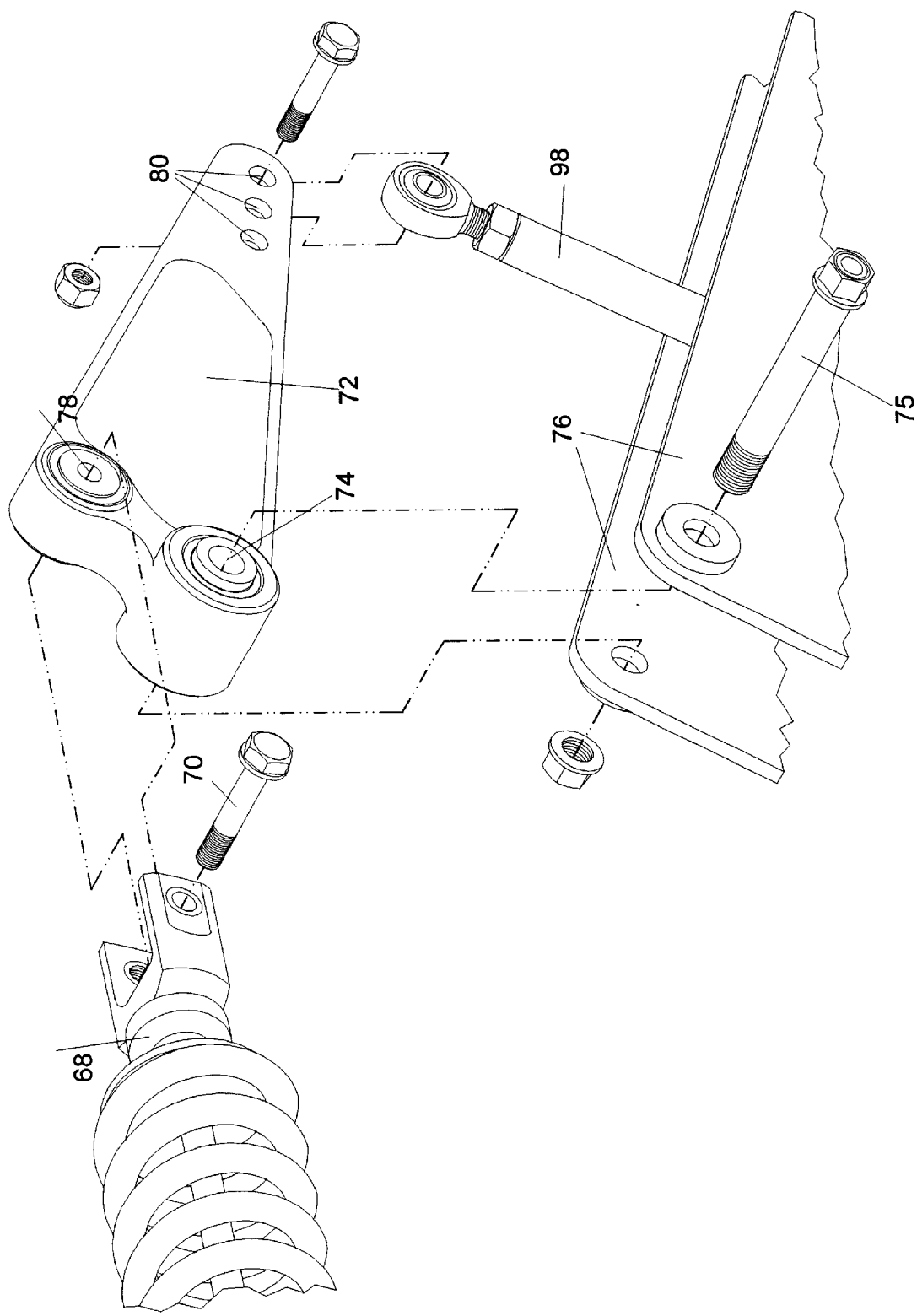
FIG. 10 is an isometric exploded assembly view of the track suspension shock absorber, force-distributing bell crank, and connecting rod of the track assembly of FIGS. 5 and 6. Portions of the swing arm suspension mount bracket are shown.

A track suspension is desirable to support and cushion converted snow cycle 10 and the operator upon track carriage 86. In one embodiment of a track suspension for snow cycle 10 illustrated in FIGS. 1, 3–6, 10 and 12, a shock absorber 68 is mounted pivotably to upper mount bracket 44 of pivot frame 42, and to a bell crank first arm pivot 78 of a bell crank 72. As shown in FIGS. 6 and 10, a bell crank fulcrum pivot 74 attaches to a swing arm suspension mount 76 on swing arm 64 such that bell crank 72 can pivot upon swing arm 64. Shock absorber 68 is operatively coupled to swing arm 64 through bell crank 72. Shock absorber 68 is also operatively coupled to the forward end track carriage 86 through bell crank 72, a connecting rod 98, and a track carriage suspension frame 90. Suspension frame 90 comprises left and right side brackets 92 and a top bracket 94 and serves as a suspension mount for the front of track carriage 86. Side brackets 92 attach to the sides of track carriage frame 112, and top bracket 94 spans across the top of track 138 and a track shield 156, and attaches to left and right side brackets 92. Track shield 156 attaches to top bracket 94 and covers the upper run of track 138. Connecting rod 98 includes a shaft 100, an upper rod end 102 which can be adjustably screwed in to or out of shaft 100, and a lower rod end 104 which can likewise be adjustably screwed in to or out of shaft 100. Lower rod end 104 of connecting rod 98 mounts selectively into one of pivot connections 96 in top bracket 94. Upper rod end 102 of connecting rod 98 mounts selectively into one of bell crank second arm pivot connections 80. The length of connecting rod 98 can be adjusted, for example, by screwing the threaded sections of upper rod end 102 and lower rod end 104 into or out of shaft 100. The track loading distribution and track suspension characteristics can be modified by adjusting the length of connecting rod 98 and/or by selectively changing pivot connection 80 and/or pivot connection 96 to which connecting rod 98 attaches. Bell crank 72 apportions the suspension force from shock absorber 68 to swing arm 64 and to the forward end of track carriage 86 through connecting rod 98 and suspension frame 90. The suspension force apportioned to the swing arm urges it pivotally downward around swing arm pivot axle 60. The suspension force apportioned to the forward end of track carriage 86 urges the track carriage pivotally downward around cogwheel axle 88 that functions as the pivot connection between track carriage 86 and swing arm 64. The suspension forces of shock absorber 68 are thus distributed to both the rearward and forward ends of track carriage 86 in a predetermined proportion to affect a predetermined longitudinal loading distribution along the length of the ground-contacting run of track 138. The converted snow cycle 10 and the operator are thus cushionably supported upon the ground-contacting run of track 138.

Figure 15:
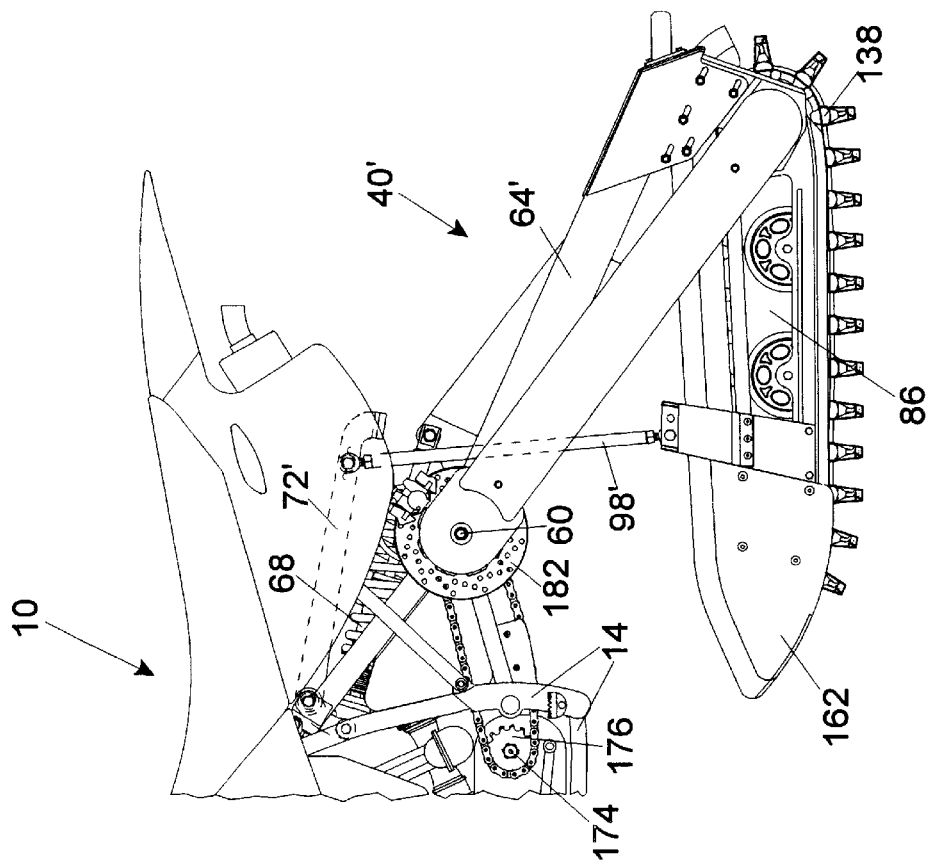
FIG. 15 is a side view of an alternate embodiment the track assembly of the snow cycle conversion kit utilizing a single shock absorber, a bell crank, and a connecting rod.
Figure 16:
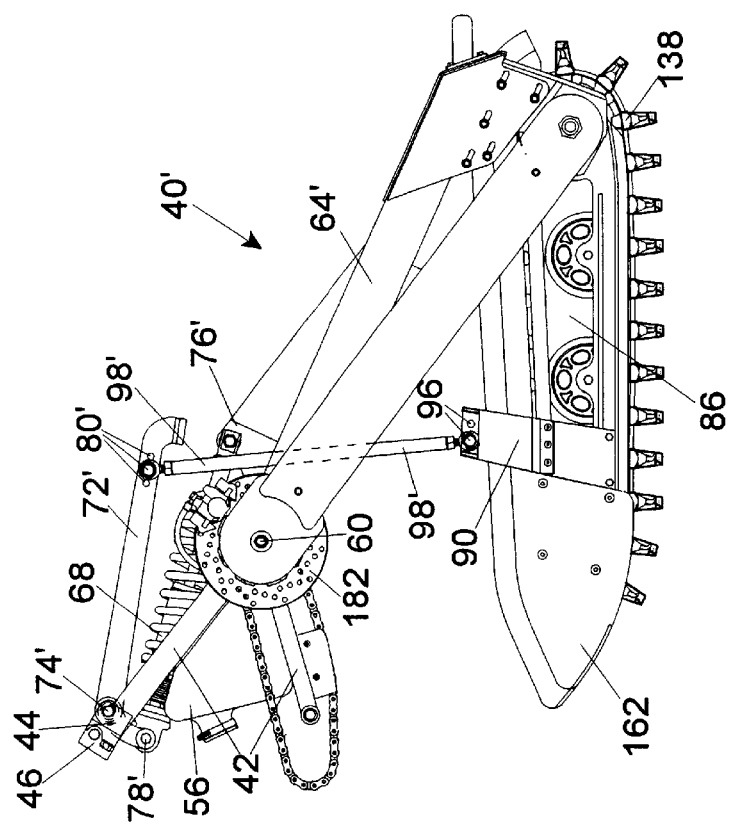
FIG. 16 is a side view of the rearward portion of a converted snow cycle having the alternate embodiment conversion kit track assembly of FIG. 15 mounted to the motorcycle chassis of FIGS. 2 and 3.

An alternate embodiment of a conversion kit track carriage suspension using a single shock absorber, a bell crank, and a connecting rod is illustrated in FIGS. 15 and 16. FIG. 15 shows the conversion kit track assembly separate from the host motorcycle chassis, and FIG. 16 shows the rear portion of motorcycle chassis 11 with track assembly 40' mounted. In this embodiment, shock absorber 68 is pivotally connected between a swing arm suspension mount 76' of a swing arm 64' and a bell crank first arm pivot 78' of a bell crank 72'. A fulcrum pivot 74' of bell crank 72' mounts rotatably to upper mount bracket 44' of pivot frame 42. Two connecting rods 98' are used in tandem, with the upper ends of connecting rods 98' connecting on opposite sides of bell crank 72' to one of a set of bell crank second arm pivot connections 80'. Connecting rods 98' extend downward on opposite sides of swing arm suspension mount 76' and shock absorber 68 and the lower ends of connecting rods 98' connect selectively into one of the pivot connections 96 of a track carriage suspension frame 90. Only one of connecting rods 98' is visible in FIGS. 15 and 16, the right side connecting rod 98' being behind and obscured by the left side connecting rod 98' in this view. Bell crank 72' apportions suspension force from shock absorber 68 through swing arm 64' to the rearward end of track carriage 86 and through connecting rods 98' and suspension frame 90 to the forward end of track carriage 86. The suspension force is apportioned to establish a predetermined loading distribution along the length of the ground-contacting run of track 138.

Figure 17:
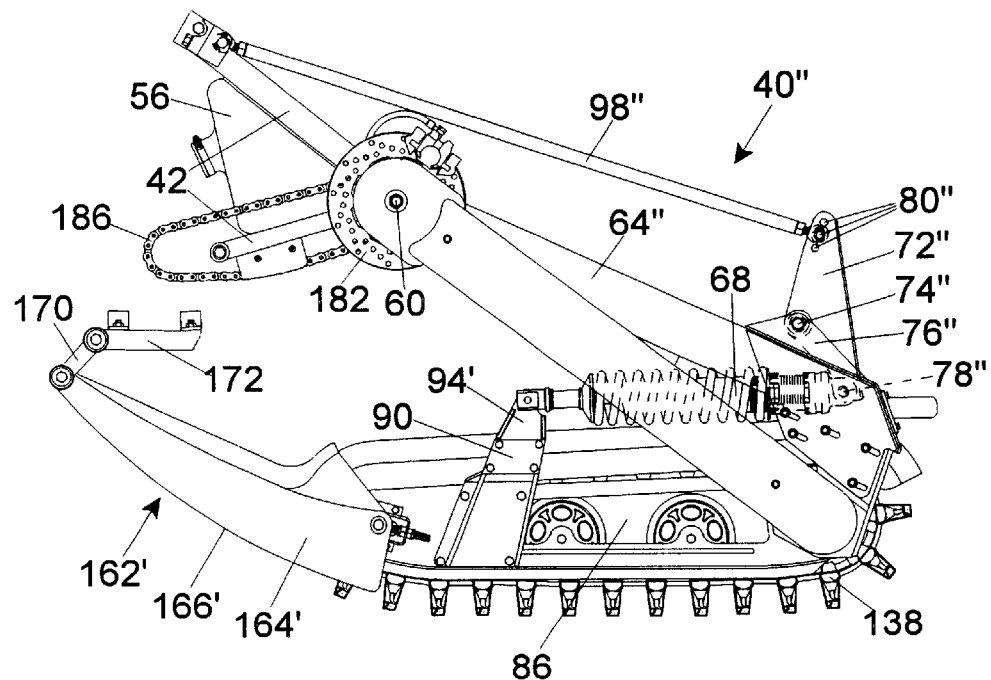
FIG. 17 is a side view of a second alternate embodiment the track assembly of the snow cycle conversion kit utilizing a single shock absorber, a bell crank, and a connecting rod. This embodiment also illustrates an alternate embodiment of the snow compacting ramp assembly utilizing a ramp frame that hinges to the front of the track carriage and is supported under the motorcycle frame by a pair of swing pivot links.
Figure 18:
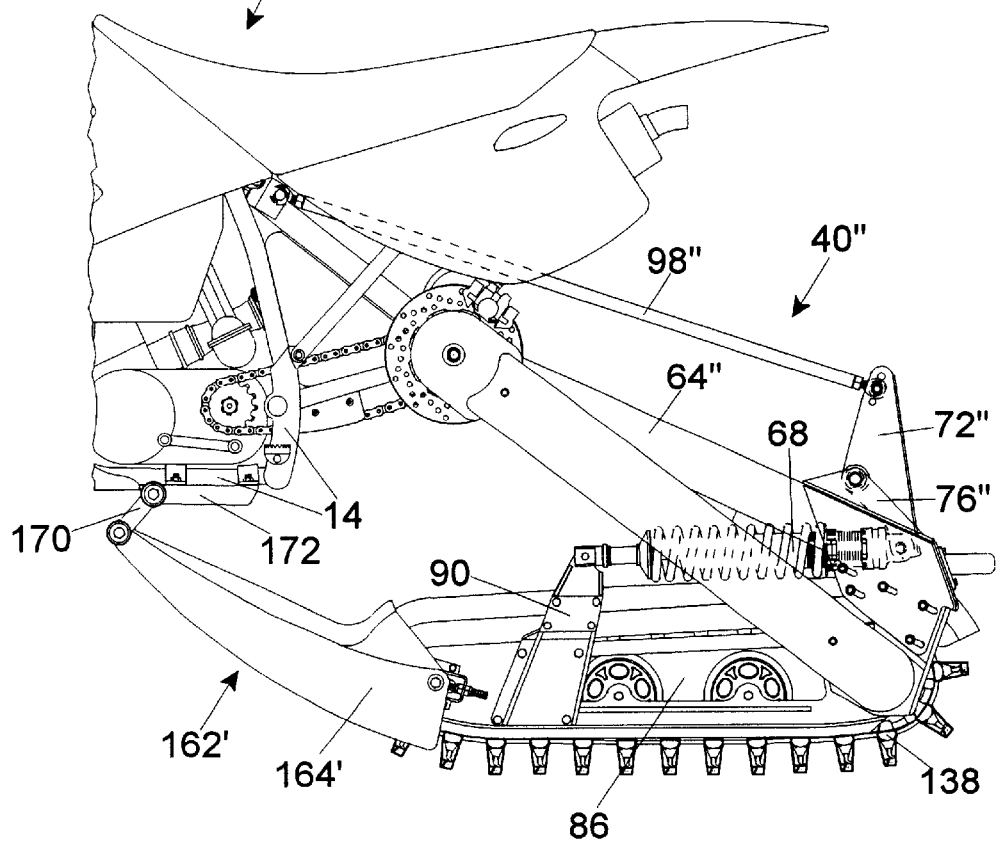
FIG. 18 is a side view of the rearward portion of a converted snow cycle having the alternate embodiment conversion kit track assembly of FIG. 17 mounted to the motorcycle chassis of FIGS. 2 and 3.

A third configuration of a track carriage suspension comprising a single shock absorber, bell crank and connecting rod is shown in FIGS. 17 and 18. FIG. 17 shows a conversion kit track assembly 40" separate from the host motorcycle chassis, and FIG. 18 shows the rear portion of motorcycle chassis 11 with track assembly 40" mounted. A fulcrum pivot 74" of a bell crank 72" mounts to a swing arm suspension mount 76" on the lower rearward portion of a swing arm 64". Shock absorber 68 connects pivotably between a top bracket 94' of suspension frame 90 and a first arm pivot 78" of bell crank 72". A connecting rod 98" connects pivotably between upper mount bracket 44' of pivot frame 42 and one of a set of second arm pivot connections 80" of bell crank 72". Shock absorber 68 applies suspension cushioning force between track carriage suspension frame 90 and first arm pivot 78" of bell crank 72". This force urges track carriage 86 downward around its hinge connection with track carriage pivot brackets 82 at cogwheel axle 88 (visible in FIGS. 7–9), and simultaneously urges bell crank 72" around bell crank fulcrum pivot 74" in a counterclockwise direction as viewed in FIG. 17. Bell crank 72" transmits this force to second arm pivot connection 80" with connecting rod 98"', creating a compression force through connecting rod 98" to frame suspension mount 70". The force couple established in bell crank pivot connection 80" and fulcrum pivot 74" urges swing arm 64" downward around swing arm pivot axle 60. Bell crank 72" apportions the cushioning force from shock absorber 68 between swing arm 64" and the forward end of track carriage 86, and between main frame 14 and swing arm 64". Suspension forces from shock absorber 68 are thus distributed in predetermined proportion to the rearward and forward ends of track carriage 86, thereby cushioning the weight of converted snow cycle 10 and the operator upon track carriage 86 while establishing a pre-determined longitudinal loading distribution between track 138 and the snow.

Three different ways have been described and illustrated in FIGS. 4, 5, and 15–18 for a single shock absorber, a force-distributing bell crank and a connecting rod to be used in combination as a conversion kit track carriage suspension. Considering the shock absorber, bell crank, and connecting rod in pivotally-connected combination, but separated from track assembly 40, there remain three open pivots. These three pivots comprise the bell crank fulcrum pivot, a shock absorber end pivot, and a connecting rod end pivot. There are six different ways or combinations in which these three open pivot connections can be individually and exclusively connected into suspension pivot mounts on pivot frame 42 (or alternately, on main frame 14), swing arm 64, and track carriage suspension frame 90. Three of these six possible connection combinations have been described and illustrated in FIGS. 4, 5, and 15–18. There exist three other pivot connection combinations of the six possible combinations that enable the forces from a single shock absorber to be distributed by the bell crank in pre-determined proportion to the rearward and forward ends of the track carriage. It is believed the three remaining connection combinations are less practical than those that have been described and illustrated, and so they are not shown or described in detail, but are summarized as follows:

The shock absorber connected pivotably between the track carriage and the bell crank first arm; the bell crank fulcrum connected pivotably to the snow cycle main frame; and the connecting rod connected pivotably between the bell crank second arm and the swing arm.

The shock absorber connected pivotably between the swing arm and the bell crank first arm; the bell crank fulcrum connected pivotably to the track carriage; and the connecting rod connected pivotably between the bell crank second arm and the snow cycle main frame.

The shock absorber connected pivotably between the main frame and the bell crank first arm; the bell crank fulcrum connected pivotably to the track carriage; and the connecting rod connected pivotably between the bell crank second arm pivot and the swing arm.

Figure 20:
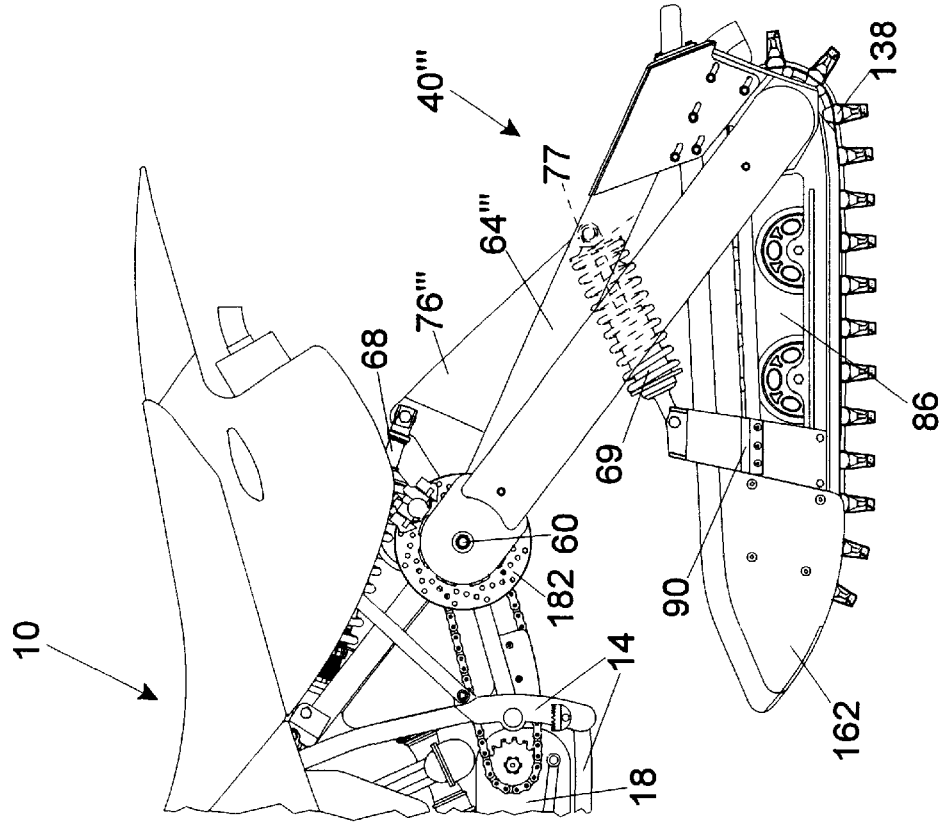
FIG. 20 is a side view of the rearward portion of a converted snow cycle having the alternate embodiment conversion kit track assembly of FIG. 19 mounted to the motorcycle chassis of FIGS. 2 and 3.
Figure 19:
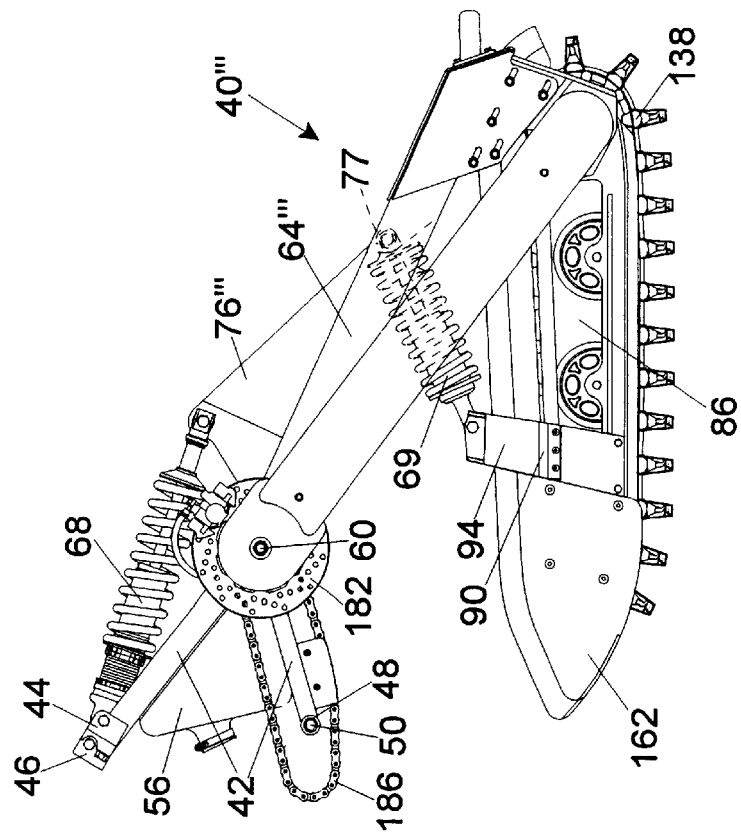
FIG. 19 is a side view of an alternate embodiment the track assembly of the snow cycle conversion kit that uses two shock absorbers.

One embodiment of a track suspension for a conversion kit track assembly that uses two shock absorbers is illustrated in FIGS. 19 and 20. Shock absorber 68 and a second shock absorber 69 each provides both spring and damping cushioning forces using, for example, a coil spring and a hydraulic damper. Shock absorber 68 is connected between upper mount bracket 44 of pivot frame 42 and a swing arm suspension mount 76''', and urges a swing arm 64''' pivotally downward from motorcycle chassis 11 around swing arm pivot axle 60. Second shock absorber 69 is connected pivotably between a lower swing arm suspension mount 77''' of swing arm 64''' and a pivot connection to top bracket 94. The force of second shock absorber 69 is applied between swing arm 64''' and suspension frame 90 to urge track carriage 86 pivotally downward around the pivot connection on cogwheel axle 88 between track carriage 86 and track carriage pivot brackets 82. The cushioning forces of shock absorbers 68 and 69 are distributed to the rearward and forward ends of track carriage 86 to establish a predetermined loading distribution along the length of the ground-contacting run of track 138. The converted snow cycle 10 and the operator are thus cushionably supported upon the ground-contacting run of track 138.

Referring to the track assembly embodiments illustrated in FIGS. 1, 3–6, 15, 16, 19 and 20, a snow compacting ramp assembly 162 is rigidly mounted to the sides of the forward portion of track carriage 86 to compress the snow ahead of the track and to ramp the track over small obstacles the track may encounter. Referring to FIGS. 5 and 6, ramp assembly 162 includes a ramp frame 164, a ramp 166 secured to the bottom of ramp frame 164, and a snow cover 168 enclosing the top of the ramp assembly. Preferably, ramp 166 is made from ultra-high molecular weight plastic to provide a low friction ramp surface that is durable, fracture resistant, and abrasion resistant. Ramp frame 164 is slightly wider than track carriage 86 and extends around the forward sides of track 138. The rearward end of ramp 166 is located at approximately the same height as the front of the lower run of track belt 140 of track 138.

An alternate embodiment snow compacting ramp assembly 162' is illustrated in conjunction with the snow cycle conversion kit track assembly illustrated in FIGS. 17 and 18. A snow compacting ramp assembly 162' is pivotally attached to the front of track carriage 86 and pivotally suspended from the bottom of main frame 14. As shown in FIGS. 17 and 18, ramp assembly 162' includes a ramp frame 164', a ramp 166' secured to the bottom of ramp frame 164', a snow cover 168' enclosing the top of the ramp assembly, a pair of ramp pivot links 170, and a main frame pivot bracket 172. Ramp frame 164' attaches pivotally to the ends of guide wheel axle 130 to form a hinge between ramp assembly 162' and track carriage 86. The front of ramp frame 164' pivots on the lower ends of pivot links 170. The upper ends of pivot links 170 hinge to main frame pivot bracket 172. Mainframe pivot bracket 172 is secured to the bottom rails of mainframe 14 using frame clamp brackets 173. The front of ramp frame 164' is supported by pivot links 170 and is constrained in movement to an arc around the pivotal connection of pivot links 170 to main frame pivot bracket 172 in close proximity to the bottom of main frame 14. Ramp assembly 162' can incline and decline and move forward and rearward as necessitated by the suspension motion of track carriage 86 relative to main frame 14 of motorcycle chassis 11.

The power transmission system of converted snow cycle 10 will now be described with reference to FIGS. 4–6. Drive power for track 138 is provided by gasoline motor 18, and is delivered through transmission 20 to a transmission output shaft 174 that mounts a transmission output shaft sprocket 176. As best viewed in FIG. 6, intermediate hub 66 is supported by and rotates on swing arm pivot axle 60. A primary intermediate sprocket 178 is attached to the inside end of intermediate hub 66. A secondary intermediate sprocket 180 is attached to the outside end of intermediate hub 66. A hydraulic disc brake 181 includes a brake disc 182 attached to the middle of intermediate hub 66 and a hydraulic brake caliper 184 that is mounted to swing arm 64. Brake caliper 184 straddles brake disc 182 and forces brake pads against the sides of brake disc 182 during braking of converted snow cycle 10. A primary drive chain 186 wraps transmission output shaft sprocket 176 and primary intermediate sprocket 178 in an endless loop and delivers drive power to intermediate hub 66. A secondary drive chain 188 wraps secondary intermediate sprocket 180 and cogwheel axle sprocket 120 in an endless loop and delivers drive power and braking torque from intermediate hub 66 to cogwheel axle 88. A secondary chain guide/cover 190 (shown in FIGS. 4 and 5, but removed in FIG. 6) encloses the upper and lower runs of secondary drive chain 188, and is attached to left swing arm brace 106*a*.

CONVERTED SNOW CYCLE OPERATION

In operation and referring to FIG. 4, a snow cycle 10 comprised of track assembly 40 and steering ski assembly 200 of the snow cycle conversion kit of the present invention in combination with chassis 11 of off-road motorcycle 2 is suspended and cushioned on ski 204 by telescoping steering fork 12, and on track carriage 86 by the combination of swing arm 64, shock absorber 68, bell crank 72, connecting rod 98 and suspension frame 90. The pivot connections of swing arm 64 to pivot frame 42 mounted to main frame 14 and to the rearward portion of track carriage 86 allow track carriage 86 to move up and down as the swing arm rotates in an arc around swing arm pivot axle 60. The pivot connection of track carriage 86 to swing arm 64 allows track carriage 86 to pivot vertically relative to the rearward end of swing arm 64. The combined motion of the swing arm and the track carriage allows the track carriage to remain level throughout the full range of track suspension travel and to incline or decline to maintain tractional contact with the terrain that converted snow cycle 10 is traversing over. Within practical limits, track carriage 86 is designed to minimize the size and mass of track 138 while maximizing the area of tractional contact between track 138 and the snow. This is accomplished by implementing a substantially fixed path for track 138 around drive cogwheels 122, guide wheels 126, idler wheels 134, and track slides 116 as illustrated in FIG. 7. The diameters of drive cogwheels 122 and guide wheels 126 are selected to be substantially minimized, but not so small as to cause large power losses due to the flexing of track 138 as it moves around drive cogwheels 122 and guide wheels 126. As shown in FIGS. 8 and 9, the central structural member of track carriage frame 112 is, preferably, fabricated from thin-walled aluminum tubing having an elliptical cross-section, or some other similarly strong shaped light weight material that provides adequate torsional rigidity for track carriage 86 with a high torsional stiffness to weight ratio. This torsional rigidity minimizes the twisting of track carriage 86 when one side of track 138 is more heavily loaded than the other as occurs when the snow cycle is banked in turns or is traversing sloped terrain. Minimizing the twisting of track carriage 86 is desirable to minimize side-slippage of converted snow cycle 10, to improve directional stability of the snow cycle, and to maintain proper tension in track 138.

It is desirable to have the axis of the pivot connection between track carriage 86 and swing arm 64 congruent with the axis of rotation of cogwheel axle 88, and to have the axis of rotation of intermediate hub 66 congruent with the axis of the pivot between swing arm 64 and pivot frame 42. These congruent axes allow track carriage 86 and swing arm 64 to move through the full range of suspension travel while keeping the length of secondary drive chain 188 relatively constant. This eliminates the need for a dynamic chain tensioner for secondary drive chain 188, and reduces the transient stresses that could load chain 188 due to suspension movement of the track carriage and swing arm. The congruency of the axes of rotation with the suspension pivot axes could be approximate, or substantially congruent, where the center of rotation of cogwheel axle 88 is within, for example, 100 mm of the axis of the pivot connection between track carriage 86 and swing arm 64. Intermediate hub 66 could be mounted with an axis of rotation substantially congruent, within 100 mm for example, with the pivot axis of the attachment of swing arm 64 to mainframe 14. The static tensioning of secondary drive chain 188 is accomplished using a threaded chain tensioner 189 (visible in FIG. 6) to adjust the length of left swing arm brace 106a in combination with chain tensioner 189. This adjusts the separation between swingarm pivot axle 60 upon which intermediate hub 66 and sprocket 180 is mounted and cogwheel axle 88 that mounts cogwheel axle sprocket 120. The holes in the brackets at the rearward end of swing arm 64 where the swing arm bolts to swing arm extension brackets 82 are elongated to allow this adjustment. These bolts are loosened while chain tensioner 189 is adjusted to achieve correct tension of drive chain 188, and are then tightened to secure swingarm 64 to extension brackets 82.

Referring to FIGS. 4 and 5, shock absorber 68 provides damped spring force between vehicle main frame 14 and first arm pivot 78 of bell crank 72. This suspension and cushioning force is geometrically distributed in predetermined proportion by bell crank 72 to the back of track carriage 86 through swing arm 64 and to the front of track carriage 86 through connecting rod 98 and suspension frame 90. The force from shock absorber 68 urges swing arm 64 rotatingly downward around swing arm pivot 60, thereby urging the back of track carriage 86 downward. The force from shock absorber 68 simultaneously urges bell crank 72 rotatingly downward around bell crank fulcrum pivot 74 on swing arm suspension mount 76, thereby urging the front of track carriage 86 downward through connecting rod 98 and suspension frame 90. The relative proportion of shock absorber cushioning force distributed to the back and to the front of track carriage 86 is determined by the dimensions, geometries and geometrical relationships of the components of the track suspension. These dimensions, geometries and geometrical relationships include the relative spacing and positioning of swing arm pivot axle 60 and upper mount 44 of pivot frame 42, the location of swing arm suspension mount 76 on swing arm 64, the lengths of and separation angle between the arms of bell crank 72, the length of connecting rod 98, and the location of pivot connections 96 on track carriage suspension frame 90. These same geometries and dimensions also determine the rates at which the suspension forces distributed to the back and the front of track carriage 86 increase as gravitational and inertial forces from the snow cycle and operator increasingly load track carriage 86, compressing shock absorber 68. To optimize the snow cycle's suspension performance and/or operator comfort, different proportions and rates of suspension force distribution to the back and front of track carriage 86 can be achieved by altering the geometrical and dimensional designs of the components of the track carriage suspension. To a more limited degree, the track carriage suspension characteristics can be modified by adjusting the length of connecting rod 98, repositioning connecting rod 98 in bell crank second arm pivot connections 80 and pivot connections 96 of suspension frame 90, and/or by adjusting the preload spring compression of shock absorber 68. For example, a suspension force distribution causing surface pressures between track 138 and the snow at the back of track carriage 86 that are fifty percent higher than surface pressures at the front of track carriage 86 could be set up. This would be desirable to enable track 138 to progressively compact the snow as track carriage 86 moves over it, thereby enhancing the traction of track 138 upon the snow. It is believed that such lighter loading of the front of track 138 and snow compacting ramp 166 allows the snow compacting ramp and the track to more easily and quickly plane up onto the surface of soft snow. Other track loading distributions and track suspension characteristics may be desired for other operational suspension and traction characteristics, and can be accomplished through modifications to the component adjustments and geometrical designs.

It is desirable to minimize the mass of the snow cycle components that are not cushioned upon the track carriage by the track suspension. Uncushioned mass borne by the track carriage is subject to much higher acceleration forces due to impacts between track 138 and the terrain obstacles and undulations that the track encounters. The higher acceleration forces resulting from additional uncushioned mass must be borne by the idler wheels, idler wheel bearings, and track slides. The life and reliability of these components are thus adversely affected. The track suspension embodiments of FIGS. 1 and 4–6 are desirable since only one shock absorber is required and the majority of the mass of the shock absorber and the bell crank are borne by the snow cycle main frame and the upper portion of the swing arm. The mass of these components is cushioned upon the track carriage by the track suspension.

For the single shock absorber and force-distributing bell crank embodiments of FIGS. 15–16 and 17–18, the operation, performance, and adjustability of the suspension characteristics are practically identical to those described for the embodiment of the single shock absorber and force-distributing bell crank embodiment illustrated in FIGS. 46. The embodiment illustrated in FIGS. 17 and 18 is less desirable since the mass of shock absorber 68 and bell crank 72" is carried by track carriage 86 and the rear of swing arm 64", and is practically uncushioned mass.

The two shock absorber track carriage suspension illustrated in FIGS. 19 and 20 differs somewhat in operation and performance from the single shock absorber/force-distributing bell crank/connecting rod embodiments of FIGS. 4–6, FIGS. 15 and 16, and FIGS. 17 and 18 in that the track carriage does not incline and decline as freely to follow terrain undulations. While the track carriage can incline and decline relative to the longitudinal axis of the snow cycle to maintain tractional contact with the snow, this is resisted by the spring and damper of second shock absorber 69. This embodiment places second shock absorber 69 between track carriage 86 and the lower-rear portion of swing arm 64, and so the mass of second shock absorber 69 is practically uncushioned.

Referring to FIGS. 4, 16 and 20, as converted snow cycle 10 moves forward, ramp 166 slides over and compresses the snow ahead of track 138 to a height about equal to the front of the lower run of track 138. This prevents the snow from packing up in front of track 138, and begins the snow compacting process that is continued beneath the track. It is expected that this progressive compacting of the snow will pack the snowflakes and granules into a more cohesive mass beneath the track, thereby allowing the traction forces from the track to be more efficiently distributed to a greater mass of snow.

The purpose of the alternate embodiment snow compacting ramp assembly 162' is the same, although the structure and function are slightly different. As facilitated by ramp pivot links 170, ramp assembly 162' can incline or decline and translate back and forth relative to main frame 14. The pivot connection of ramp frame 164' to guide wheel axle 130 of track carriage 86 allows ramp assembly 162 to incline and decline relative to track carriage 86. This snow compacting ramp configuration allows track carriage 86 to move through the entire range of travel of the track suspension while holding the lower rear of ramp 166 in desired proximity to the forward end of the lower run of track 138. In this way, a snow compacting ramp having a substantially larger ramp area can be deployed in the limited space between the lower extremity of main frame 14 and the snow while allowing the full range of suspension motion of track carriage 86.

Referring again to FIGS. 4 and 13, the rear of ski 204 is urged downward around ski pivot axle 208 by ski biasing shock absorber 210, thereby forcing the forward tip of the ski upward, allowing it to more easily plane up onto the surface of the snow. The force from shock absorber 210 also causes ski 204 to incline upward when converted snow cycle 10 becomes airborne to prevent the tip of ski 204 from burrowing into the snow upon landing. The damping provided by shock absorber 210 helps prevent ski 204 from oscillating around ski pivot axle 208 when the ski is airborne and helps reduce undesirable vibrations and oscillations of ski 204 when it is traversing choppy or uneven snow surfaces. Ski wear runner 205 attached to the bottom center of ski 204 enhances the directional stability of ski 204 and protects it from abrasion.

Snow Bicycle Conversion Kit Structure

Figure 22:
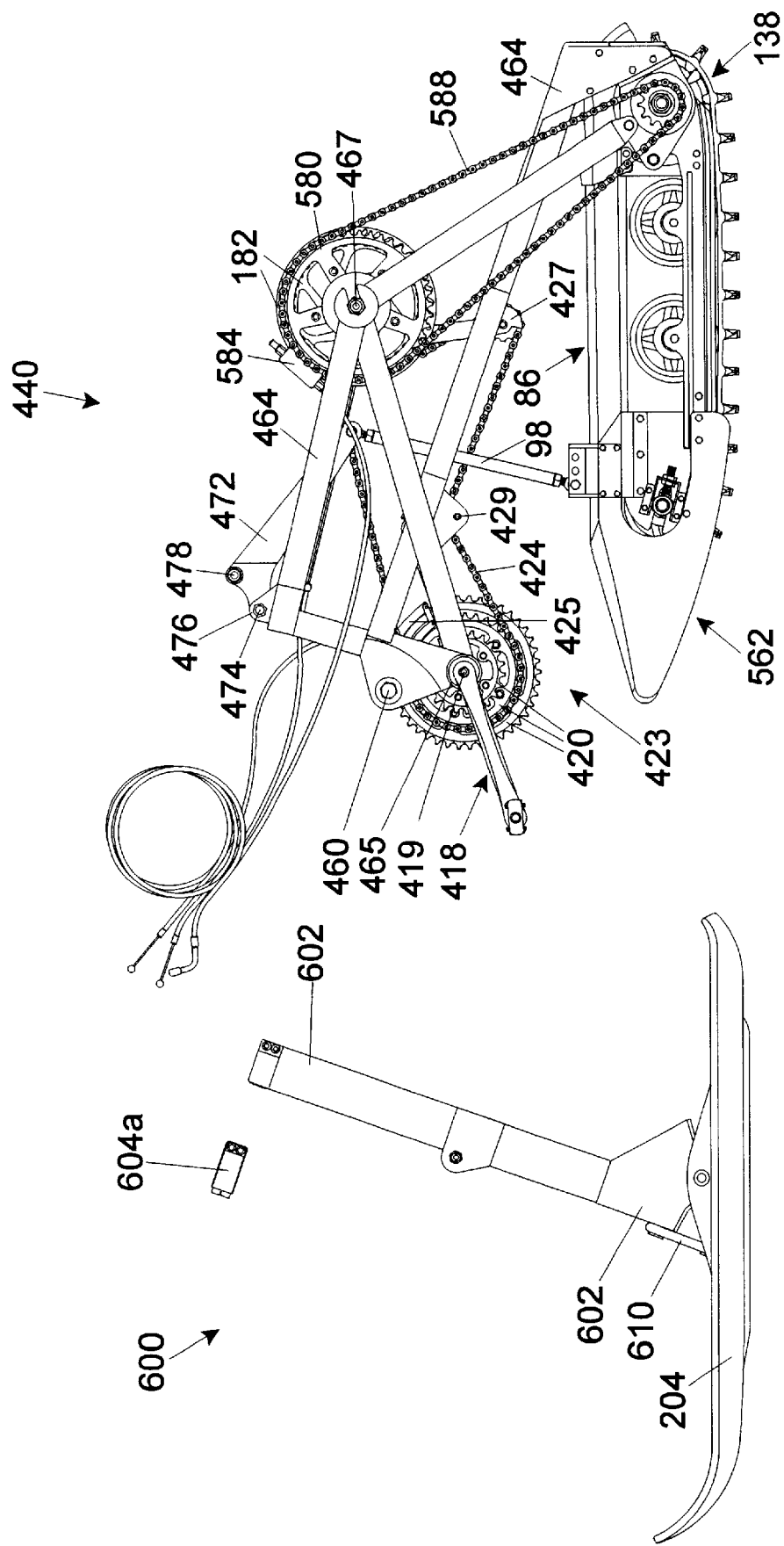
FIG. 22 is a side view of a snow bicycle conversion kit track assembly and steering ski assembly.
Figure 23:
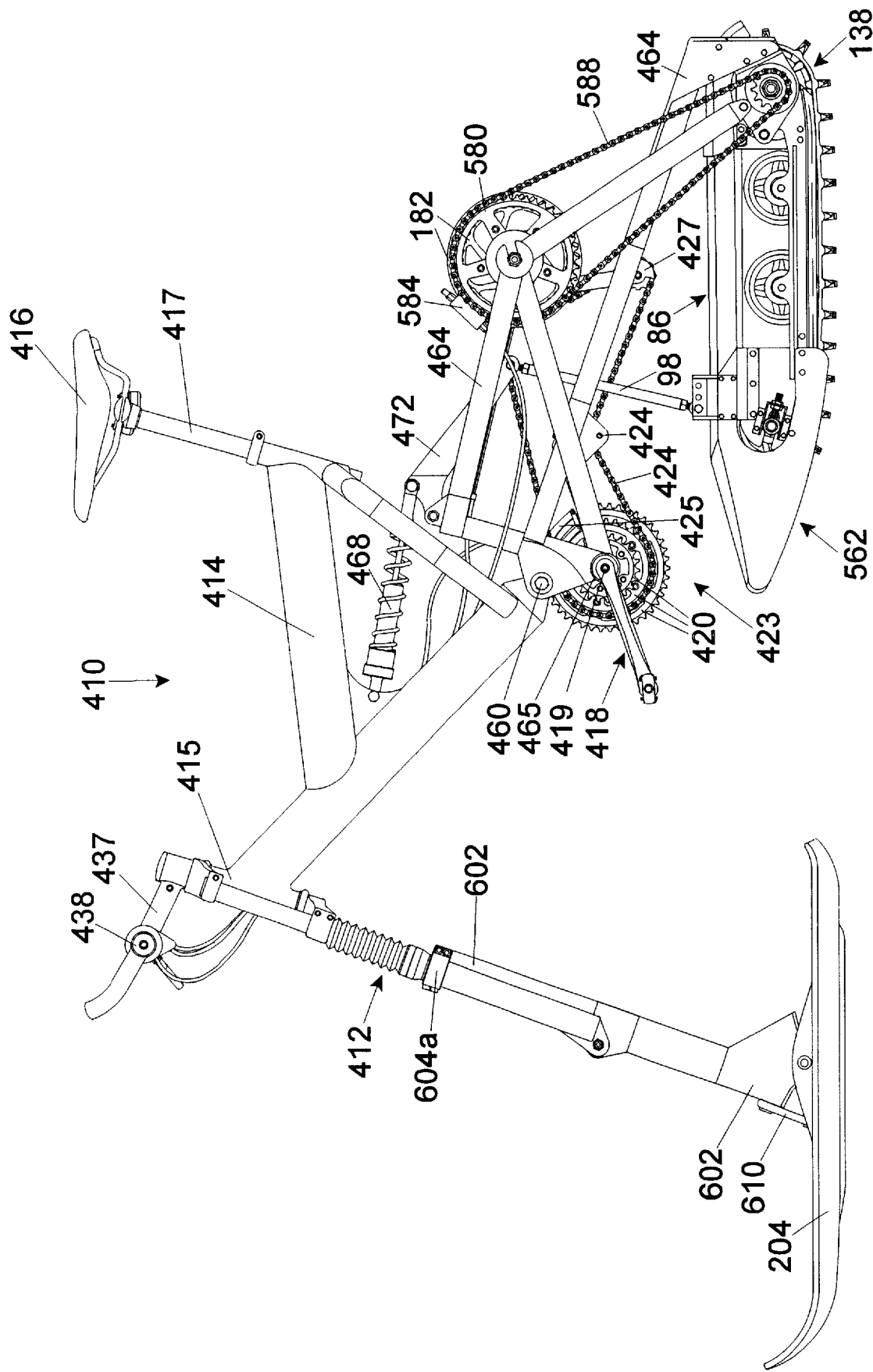
FIG. 23 is a side view of a snow bicycle made up of the conversion kit track assembly and the steering ski assembly of FIG. 22 mounted to the chassis of the mountain bicycle of FIG. 21.

FIGS. 23–25 illustrate from the side, front, and rear, respectively, a kit-converted human-powered bicycle-type snow vehicle designated generally by the reference number 410. Converted snow vehicle 410 is referred to as snow bicycle 410 to differentiate it from motor-powered snow cycle 10. Snow bicycle 410 is comprised of the frame, steering and suspension fork, handlebar and controls, and the saddle and seatpost of a full-suspension mountain bicycle in combination with a track assembly 440 and a ski steering assembly 600 of the snow bicycle conversion kit of the present invention. While converted snow bicycle 410 appears quite different from converted snow cycle 10, most of the conversion kit components of snow bicycle conversion kit 440+600 that are germane to the present invention are similar in appearance and have the same purpose and function as the corresponding conversion kit components of snow cycle conversion kit 40+200. This is apparent in comparing FIG. 22 to FIG. 1. To avoid redundancy of definition, and to enhance the comparisons of snow bicycle 410 to snow cycle 10, the same reference numbers are used for like components of the snow cycle and snow bicycle embodiments. Where component structure and appearance are significantly different, different reference numbers are used. If the function of a differently-appearing component of snow bicycle 410 is the same as the function of the corresponding component of snow cycle 10, the reference number is exactly 400 greater for the comparable component in the snow bicycle embodiment.

Figure 21:
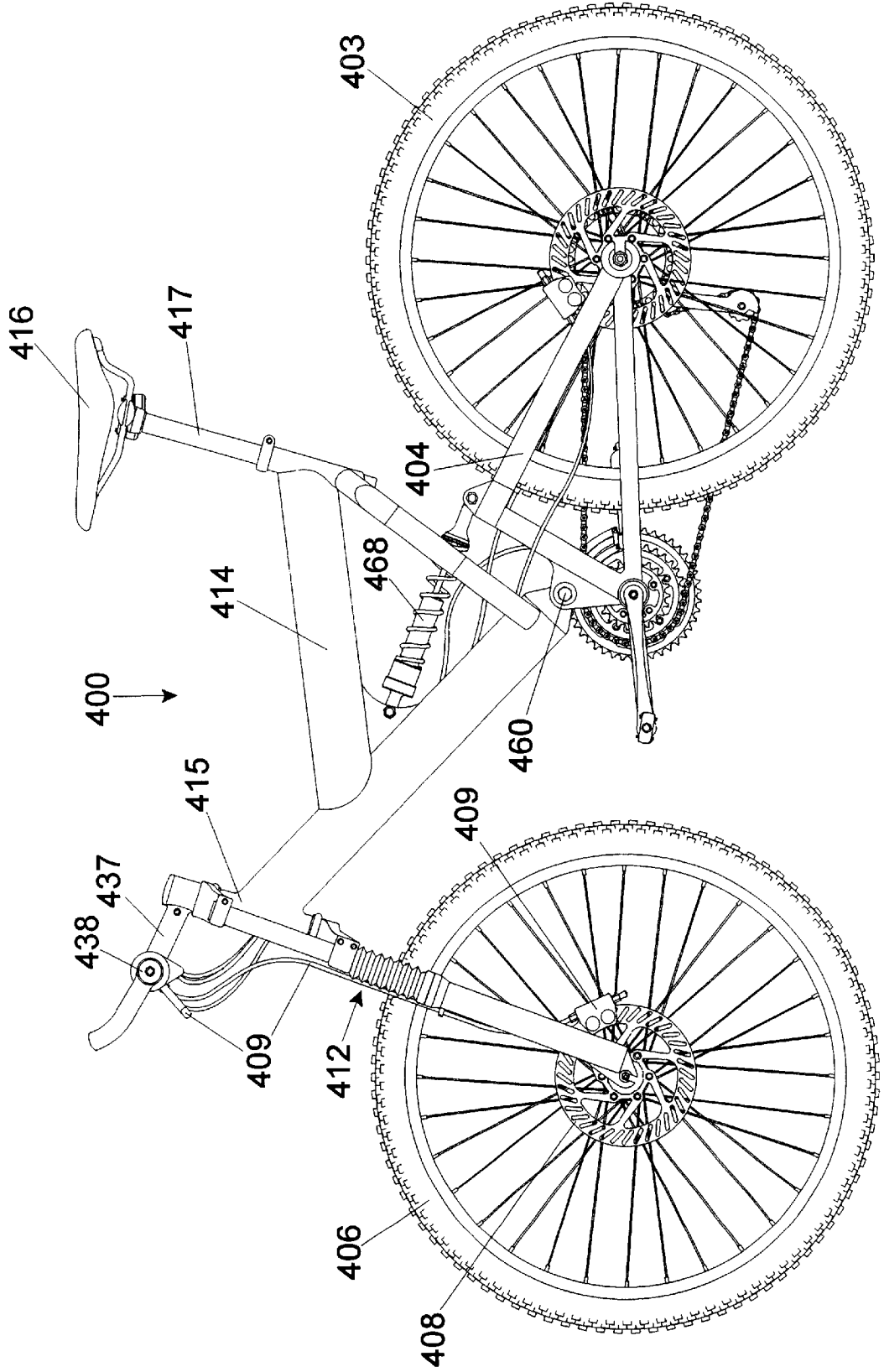
FIG. 21 is a side view of a full-suspension mountain bicycle of the type candidate for conversion to a snow bicycle using a conversion kit of the present invention.

Converted snow bicycle 410 retains many of the parts and much of the structure of a typical full-suspension mountain bicycle. Referring to FIG. 21, a full-suspension mountain bicycle 400 that is candidate for conversion to a suitable snow bicycle using the conversion kit of the present invention is illustrated. A first embodiment of a snow bicycle conversion kit is shown in FIG. 22. To convert mountain bicycle 400 of FIG. 21 into a snow bicycle 410 (as illustrated in FIGS. 23–25), front wheel 406, front brake disc 408 and front brake caliper, cable and lever assembly 409 are removed from mountain bicycle 400 and ski steering assembly 600 is mounted to steering fork 412. Rear wheel 403, swing arm frame 404 and the drive train comprising the pedal crank, chainring sprockets, derailleurs and rear brake disc are removed from mountain bicycle 400 and track assembly 440 is mounted to bicycle frame 414 at a swing arm pivot 460. The rearward end of the mountain bicycle shock absorber 468 is attached to first arm pivot 478 of bell crank 472.

Referring to FIG. 23, the converted snow bicycle 410 includes a main frame 414 with a steering head tube 415, a steering fork 412, a saddle 416, a seatpost 417, a pedal crank 418 mounted upon a crank axle 419, a handlebar 438, and a handlebar stem 437. Crank axle 419 rotates within a bottom bracket 465 of a swing arm frame 464. Also included is a bicycle drive train 423 that comprises a primary drive chain 424, a set of chainring sprockets 420 mounted to pedal crank 418, a front chain derailleur 425, a front derailleur shifter 446, a cogset 426, a rear derailleur 427, and a rear derailleur shifter 447. Derailleur shifters 446 and 447 are mounted to handlebar 438. All of these components are of the general type and construction used in many mountain bicycles of current manufacture, and perform the same functions as they do in mountain bicycles. Because of this, the structure and operation of these components will not be further described.

In comparing the structure of converted snow bicycle 410 to that of converted snow cycle 10, the snow bicycle illustrations of FIGS. 22, 23, 27 and 26 are comparable with the snow cycle illustrations of FIGS. 1, 4, 5 and 6, respectively.

Swing arm frame 464 of snow bicycle conversion kit track assembly 440 is different in structure but very similar in function to swing arm 64 of snow cycle conversion kit track assembly 40. Swing arm frame 464 attaches pivotally to snow bicycle main frame 414 at a swing arm pivot 460. Track carriage 86 is basically the same in structure and function as track carriage 86 of converted snow cycle 10 illustrated in FIGS. 7–9, differing only in size and in some instances, width to height aspect ratio. Left and right track carriage pivot brackets 482 are slightly different in shape than track carriage pivot brackets 82 of snow cycle track assembly 40, but are identical in function. FIGS. 7–9 and the accompanying description of track carriage 86 already presented for the snow cycle conversion kit apply also to the snow bicycle conversion kit embodiment of track carriage 86. Referring now also to FIG. 26, track carriage pivot brackets 482 attach to swing arm frame 464 and to left and right swing arm braces 506. Cogwheel axle 88 rotates in bearings 84 mounted in pivot brackets 482 and serves as a hinge joint between track carriage 86 and swing arm frame 464. Swing arm frame 464 pivots vertically around swing arm pivot 460 on main frame 414, and track carriage 86 pivots vertically around the connection of cogwheel axle 88 to pivot brackets 482. The resulting scissors-type swing arm structure and pivot connections allow track carriage 86 to move vertically under swing arm frame 464 while maintaining a level orientation, inclining, or declining as needed to keep track 138 in tractional contact with the terrain below snow bicycle 410.

The track carriage suspension for converted snow bicycle 410 illustrated in FIGS. 23–27 has the same in basic structure and function as the track carriage suspension of converted snow cycle 10 illustrated in FIG. 4. The descriptions of structure and operation presented for that track carriage suspension also apply conceptually to the track carriage suspension of converted snow bicycle 410. Shock absorber 468 is pivotally mounted between main frame 414 and bell crank first arm pivot 478 of bell crank 472. Bell crank 472 transmits and apportions suspension force from shock absorber 468 through a bell crank fulcrum pivot 474 to a swing arm frame suspension mount 476. The apportioned force urges swing arm frame 464 downward around swingarm pivot 460, forcing the rear portion of track carriage 86 downward. The suspension force from shock absorber 468 also urges bell crank 472 in a clockwise direction (as viewed in FIG. 27) around bell crank fulcrum pivot 474, thereby apportioning and transmitting suspension force through connecting rod 98 to a top bracket 94 mounted to a ramp frame 564 of a snow ramp assembly 562. Ramp frame 564 is attached to track carriage frame 112, and transmits the apportioned suspension force to the front of track carriage 86, urging it downward around the pivot connection on cogwheel axle 88 between pivot brackets 482 and track carriage 86. The suspension force of shock absorber 468 is thus apportioned and distributed to both the rearward and forward ends of track carriage 86 in a predetermined proportion to affect a predetermined loading distribution along the ground-contacting run of track 138. Like snow cycle 10, the length adjustment of connecting rod 98 and alternate pivot mounting locations for connecting rod 98 in a set of bell crank pivot connections 480 and in pivot connections 96 of top bracket 94 allow for limited adjustment of the front-to-rear loading distribution of track 138. Alternate track suspension embodiments already described and illustrated for snow cycle 10, including the three track suspension embodiments illustrated in FIGS. 15–20, are also, with appropriate modification, alternate embodiments of a track suspension for snow bicycle track assembly 440.

Figure 27:
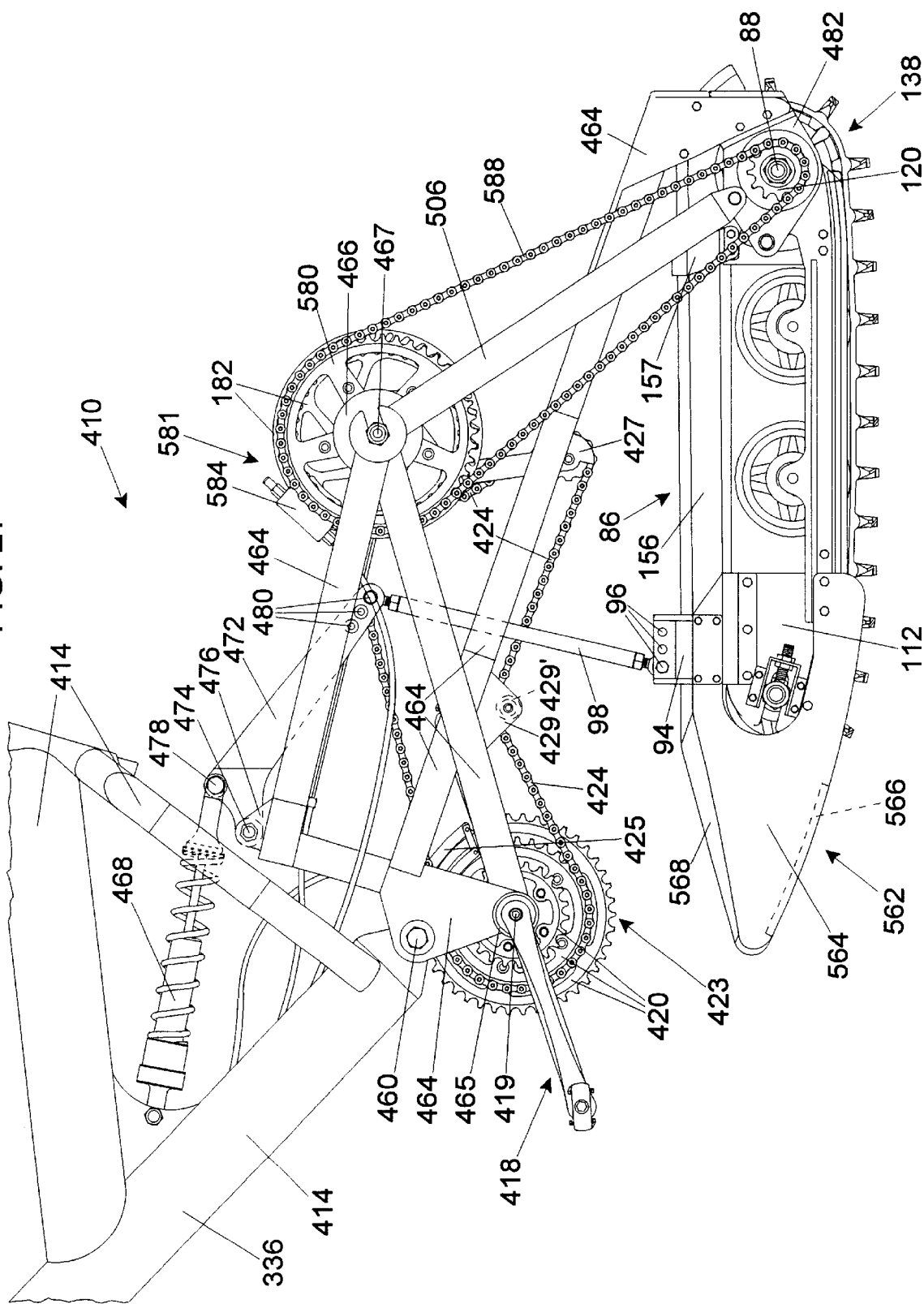
FIG. 27 is a enlarged side view of the track assembly of the conversion kit of FIG. 22 mounted to the chassis of the mountain bicycle of FIG. 21.

Referring to FIGS. 26 and 27, Intermediate hub 466 mounts and rotates on an intermediate hub axle 467 that attaches to the top center portion of swing arm frame 464. Bicycle drive train 423 couples pedal crank 418 to intermediate hub 466 just like a drive train of a common multi-speed bicycle couples the bicycle pedal crank to the rear wheel hub. Primary drive chain 424 of bicycle drive train 423 is routed through a chain hanger 429 that is attached to the underside of swing arm frame 464. A bearing-suspended chain idler wheel 429' is mounted within chain hanger 429, and allows primary drive chain 424 to circulate through the chain hanger with minimal friction.

A disc brake 581 includes brake disc 182 and brake caliper 584. Brake caliper 584 straddles brake disc 182 and mounts to swing arm frame 464. Brake caliper 584 forces brake pads against the sides of brake disc 182 when the operator actuates a brake lever 448 that is mounted to handlebar 438 (visible in FIGS. 23–25). Referring also now to FIG. 26, brake disc 182 attaches concentrically to the mid-portion of intermediate hub 466 and a secondary intermediate sprocket 580 attaches concentrically to the left side of intermediate hub 466. A secondary drive chain 588 wraps secondary intermediate sprocket 580 and cogwheel axle sprocket 120 in an endless loop and transmits drive power and braking torque from intermediate hub 466 to cogwheel axle 88.

Snow compacting ramp assembly 562, best viewed in FIGS. 26 and 27, comprises ramp frame 564, a snow compacting ramp 566 secured to the bottom of ramp frame 564, and a snow cover 568 enclosing the top of ramp frame 564. The side members of ramp frame 564 extend around the forward end of track 138 and attach to the forward sides of track carriage frame 112. Ramp frame 564 holds ramp 566 in a fixed attitude relative to track carriage 86 with the lower rearward end of ramp 566 at approximately the same height as the front of the lower run of track 138. Top bracket 94 bridges over the top of track 138 and track shield 156, attaching to the tops of the rearward side members of ramp frame 564.

Figure 28:
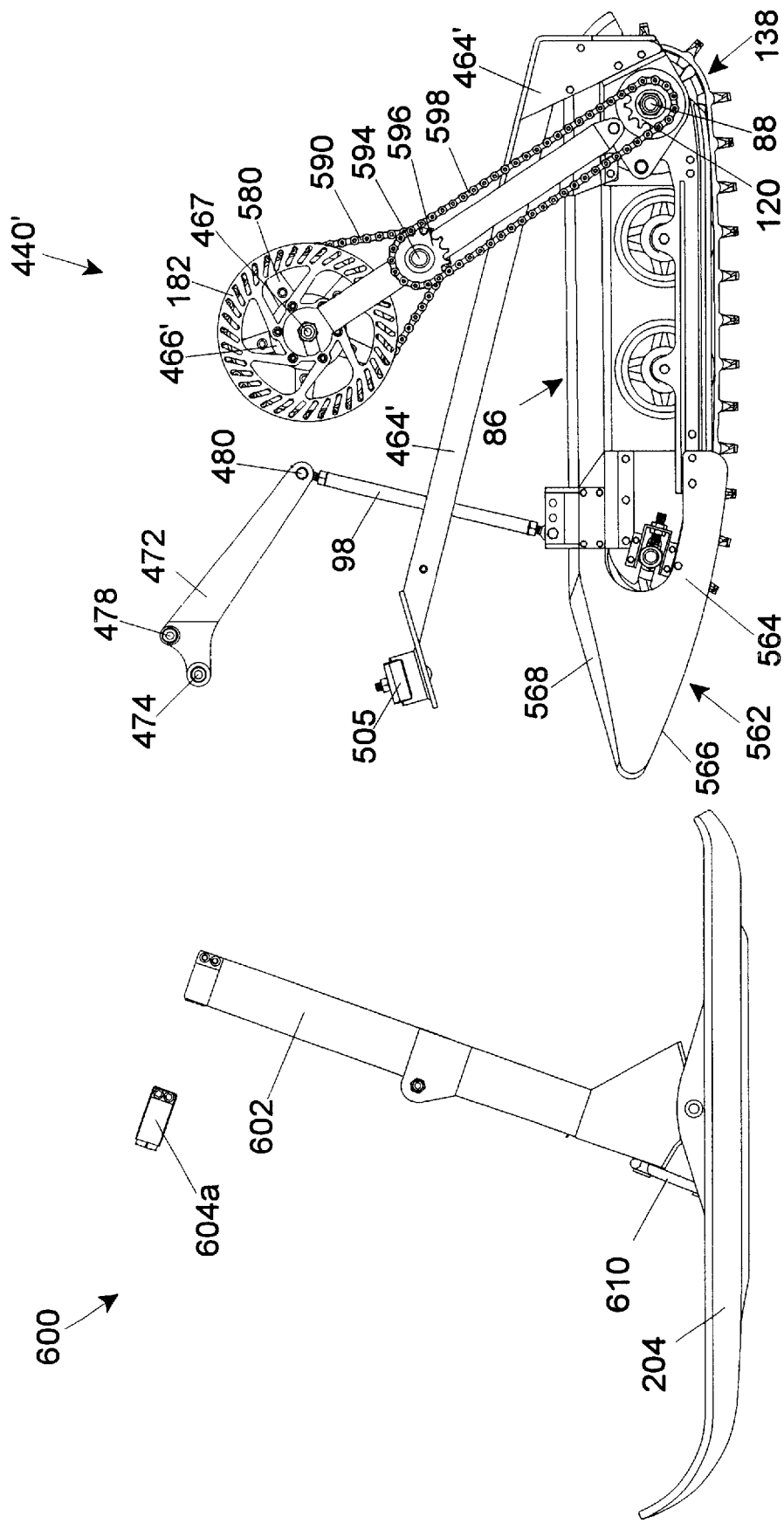
FIG. 28 is a side view of an alternate embodiment of the snow bicycle conversion kit track assembly and steering ski assembly of the present invention

A second embodiment snow bicycle track assembly 440' is illustrated in FIG. 28 and is shown mounted to swing arm frame 404 of mountain bicycle 400 in FIG. 29. As evident from FIG. 28, track assembly 440' is simpler, having fewer components than track assembly 400 shown in FIG. 22. To attach track assembly 440' to mountain bicycle 400, only rear wheel 403 need be removed from the mountain bicycle. Intermediate hub axle 467 mounts in place of the rear wheel axle on mountain bicycle swing arm frame 404 and a swing arm clamp bracket 505 at the forward end of a swing arm 464' clamps to the lower portion of swing arm frame 404 directly behind bottom bracket 465. Mountain bicycle shock absorber 464 is detached at its rearward end from swing arm frame 404, and fulcrum pivot 474 of bell crank 472 is pivotally mounted in its place on swing arm frame 404. The rearward end of shock absorber 464 is then pivotally attached to a first arm pivot 478 of bell crank 472. Swing arm frame 404 of mountain bicycle 400 is too narrow to accept an intermediate hub of sufficient width to align secondary intermediate sprocket with cogwheel axle sprocket 120. Because of this, a narrower intermediate hub 466' and an additional jackshaft 594 are utilized. In this embodiment, secondary intermediate sprocket 580 is mounted centrally on narrower intermediate hub 466'. Jack shaft 594 is journaled to the left of swing arm braces 506' and mounts an inboard jackshaft sprocket 592 and an outboard jackshaft sprocket 596. A first secondary drive chain 590 wraps secondary intermediate hub sprocket 580 and inboard jackshaft sprocket 592 to transfer motive and braking torque from intermediate hub 466' to jackshaft 594. A second secondary drive chain wraps outboard jackshaft sprocket 596 and cogwheel axle sprocket 120 to transfer motive and braking torque to cogwheel axle 88 and through cogwheels 122 to track 138.

Referring now to FIGS. 23–26, the front steering and suspension components of snow bicycle ski steering assembly 600 are practically identical in structure and function to those of snow cycle ski steering assembly 200. A telescoping steering fork 412 comprising a pair of fork tubes 434 and a pair of fork sliders 436 has substantially the same external structure and function as telescoping steering fork 12 of snow cycle 10. The combined structure of steering extension frame 602, ski 204 and ski pivot bracket 206 has basically the same structure and function for snow bicycle ski steering assembly 600 as the combined structure comprising these components for snow cycle ski steering assembly 200 illustrated in FIGS. 13 and 14. In ski steering assembly 600, an elastomeric spring 610 connects between the front of extension frame 602 and the forward portion of ski pivot bracket 206. Elastomeric spring 610 lifts the front of ski 204, just as shock absorber 210 does in snow cycle 10. Elastromeric spring 610 is formed from rubber or other durable elastomer compound.

CONVERTED SNOW BICYCLE OPERATION

In operation, referring to FIGS. 23–27 and comparing to the corresponding FIGS. 4–6 for converted snow cycle 10, converted snow bicycle 410 is very similar in operation to converted snow cycle 10. The obvious major difference is that snow bicycle 410 is human-powered, and snow cycle 10 is powered by a gasoline motor. Otherwise, the operational description for snow cycle 10 generally applies to snow bicycle 410.

Snow bicycle 410 includes a track suspension that is very similar to the track suspension of snow cycle 10, and features similar structure, functionality, performance characteristics, and adjustability—albeit scaled to the size, weight, and performance requirements of a snow bicycle. Track carriage 86 and track 138 in the embodiment of snow bicycle 410 are identical in structure and function to track carriage 86 and track 138 of snow cycle 10, but are scaled in size and weight as suitable for a human-powered snow bicycle application. Traction paddles 142 of track 138 are proportionately smaller to be suitable to the requirements for snow bicycle use.

A non-articulating ramp is used in snow bicycle track assembly 440. Snow compacting ramp assembly 562 is rigidly attached to track carriage frame 112, and thus moves vertically, inclines, and declines with the suspension movement of track carriage 86. Ramp 566 slides over and compresses the snow ahead of track 138 to a height about equal to the front of the lower run of track 138, preventing snow from packing up in front of track 138.

The bicycle drive train 423 shown in FIGS. 23–27 has the same structure and operation that drive trains of most mountain bicycles of present manufacture have. A wide range of gearing ratios offered by bicycle drive train 423 enables the snow bicycle operator to select a gearing ratio suited to the incline of the terrain and the effort the operator wishes to expend in pedaling the snow bicycle. Chain hanger 429 is deployed to allow the full suspension articulation of track carriage 86 below swing arm frame 464 without interference between primary drive chain 424 and suspension frame top bracket 94. Chain hanger 429 also helps to maintain correct tension in primary drive chain 424 under the jarring that occurs when the snow bicycle traverses rough terrain. Snow bicycle 410 has only one snow traction device, namely track 138, and requires only one brake and brake actuator. A disc brake such as disc brake 581 is desirable to provide strong, reliable braking in snowy, icy and wet conditions.

Steering extension frame 602, ski 204, and ski pivot bracket 206 of snow bicycle steering ski assembly 600 are practically identical in structure and operation to steering extension frame 202, ski 204, and ski pivot bracket 206 of snow cycle steering ski assembly 200. The size, weight, and strength of these components is reduced in the snow bicycle embodiment as is acceptable and desirable for a relatively lightweight human-powered vehicle. In snow bicycle 410, elastomeric spring 610 (visible in FIGS. 23 and 26) is used to urge the front of ski 204 upward, allowing it to more easily plane up onto the surface of the snow. The contraction force of elastomeric spring 610 also causes ski 204 to incline when snow bicycle 410 becomes airborne to help prevent the ski tip from burrowing into the snow upon landing.

The operation and performance of a snow bicycle utilizing the second embodiment track assembly 440' is virtually identical to that of a converted snow bicycle that utilizes the first embodiment track assembly 440, and the previous description of operation applies equally to this second embodiment snow bicycle conversion kit.

Snow cycle and snow bicycle conversion kit structural components such as the swing arm, track carriage frame and the snow compacting ramp frame are made of any suitable structurally stable material and cross section. Further, although only the principal bearings are specifically shown on the drawings and described above, it is desirable to use bearings, bushings and the like on all pivot connections and rotating hubs to reduce wear and facilitate the relative movement of the parts. It is expected that the ski will be manufactured from an ultra-high molecular weight plastic or other suitable structural material offering low friction with the snow, adequate durability, and good resistance to abrasion and wear.

Although the invention has been shown and described with reference to the foregoing embodiments, alternative embodiments may be made without departing from the spirit and scope of the invention as defined in following claims.

I claim:

1. A conversion kit for converting a two-wheeled land vehicle for use as a snow vehicle by removing the wheels and other non-essential components from the land vehicle and mounting the conversion kit assemblies to the land vehicle, the land vehicle comprising a frame and an elongated steering member operative about a steering axis, the conversion kit assemblies comprising:

an arm having a forward portion configured for mounting to the land vehicle frame and a rearward portion, the rearward portion of the arm comprising a left pivot bracket and a right pivot bracket in which a drive wheel is disposed between the left pivot bracket and the right pivot bracket, the drive wheel rotatably mounted to the left and right pivot brackets;

a single endless loop track drivingly engaged by the drive wheel and extending in a forward direction therefrom to position the endless loop track under the arm to allow the track to pivot vertically under the arm about a pivot axis at the rearward portion of the track.

2. The conversion kit according to claim 1, further comprising a ski mounting frame having an upper portion configured for attachment to the elongated steering member and a lower portion mounting a ski.

3. The conversion kit according to claim 1, wherein the two-wheeled land vehicle is a motorcycle having a motor, the conversion kit further comprising a power transmission configured to operatively couple the drive wheel to the motor.

4. The conversion kit according to claim 1, wherein the two-wheeled land vehicle is a bicycle having a pedal crank, the conversion kit further comprising a power transmission configured to operatively couple the drive wheel to the pedal crank.

5. The conversion kit according to claim 1, wherein the arm is a swing arm and the forward portion of the swing arm is configured for pivotal mounting to the frame.

6. The conversion kit according to claim 1, wherein the forward portion of the arm comprises a pivot frame configured for rigid attachment to the land vehicle frame and the rearward portion of the arm comprises a swing arm with a forward end pivotally mounted to the pivot frame.

7. The conversion kit according to claim 1, wherein the land vehicle frame comprises a mainframe and a swing arm pivotally connected to the mainframe and the arm of the conversion kit is configured for rigid mounting to the land vehicle swing arm.

8. A conversion kit for converting a two-wheeled land vehicle for use as a snow vehicle by removing the wheels and other non-essential components from the land vehicle and mounting the conversion kit assemblies to the land vehicle, the land vehicle comprising a frame and an elongated steering member operative about a steering axis, the conversion kit assemblies comprising:

a swing arm having a forward portion and a rearward portion, the forward portion of the swing arm having a pivotal joint configured for connection to the land vehicle frame;

a track carriage having a rearward portion and a forward portion, the rearward portion of the track carriage pivotally mounted to the rearward portion of the swing arm;

a track suspension including a resilient cushion, a bell crank and a connecting linkage, the track suspension connected to the track carriage and configured for connection to the land vehicle frame, the track suspension operative between the track carriage and the frame to cushionably bias both the rearward portion of the track carriage and the forward portion of the track carriage downward from the frame, the track suspension allowing the track carriage to move in a scissors fashion under the swing arm;

a drive wheel rotatably mounted to the rearward portion of the track carriage; and an endless loop track carried by the track carriage, the track carriage moveably bearing upon an interior surface of a bottom run of the track for support of the land vehicle upon the track, the track drivingly engaged by and extending forward from the drive wheel.

9. The conversion kit according to claim 8, further comprising a ski mounting frame having an upper portion configured for attachment to the elongated steering member and a lower portion mounting a ski.

10. The conversion kit according to claim 8, wherein the forward portion of the swing arm is configured for pivotal mounting to a swing arm pivot of the land vehicle frame.

11. The conversion kit according to claim 8, further comprising a swing arm pivot frame configured for rigid attachment to the land vehicle frame and the forward end of the swingarm pivotally mounts to the pivot frame.

12. The conversion kit according to claim 8, wherein the land vehicle frame comprises a mainframe and a swingarm frame pivotally mounted to the mainframe, and the swing arm of the conversion kit is configured for rigid attachment to the land vehicle swingarm frame.

13. The conversion kit according to claim 8, wherein the two-wheeled land vehicle is a motorcycle having a motor, the conversion kit further comprising a power transmission configured to operatively couple the motor to the drive wheel.

14. The conversion kit according to claim 8, wherein the two-wheeled land vehicle is a bicycle having a pedal crank, the conversion kit further comprising a power transmission configured to operatively couple the pedal crank to the drive wheel.

15. The conversion kit according to claim 8, wherein the resilient cushion comprises a shock absorber.

16. The conversion kit according to claim 8, wherein the resilient cushion includes a spring.

17. The conversion kit according to claim 15, wherein the shock absorber includes a hydraulic damper.

18. The conversion kit according to claim 8, wherein the swing arm includes a swing arm suspension mount, and the track carriage includes a track carriage suspension mount at a location away from the location at which the track carriage mounts to the swing arm;

the connecting linkage comprises a connecting rod having a first end and a second end;

the bell crank comprises a fulcrum, a first arm and a second arm;

the resilient cushion comprises a shock absorber having a first end pivotally connected to the first arm of the bell crank and a second end;

the first end of the connecting rod pivotally connected to the second arm of the bell crank; and two members of the set comprising the bell crank fulcrum, the second end of the shock absorber, and the second end of the connecting rod each exclusively pivotally connected to one of the track carriage suspension mount or the swing arm suspension mount, and the remaining member of the set configured for pivotal connection to the land vehicle frame.

19. The conversion kit according to claim 18, wherein the fulcrum of the bell crank connects to the swing arm suspension mount, the second end of the connecting rod connects to the track carriage suspension mount, and the second end of the shock absorber is configured for connection to the land vehicle frame.

20. The conversion kit according to claim 18, wherein the fulcrum of the bell crank connects to the swing arm suspension mount, the second end of the shock absorber connects to the track carriage suspension mount, and the second end of the connecting rod is configured for connection to the land vehicle frame.

21. The conversion kit according to claim 18, wherein the second end of the shock absorber connects to the swing arm suspension mount, the second end of the connecting rod connects to the track carriage suspension mount, and the fulcrum of the bell is configured for connection to the land vehicle frame.

22. The conversion kit according to claim 18, wherein the second end of the shock absorber connects to the track carriage suspension mount, and the second end of the connecting rod connects to the swing arm suspension mount, and the fulcrum of the bell crank is configured for connection to the land vehicle frame.

23. The conversion kit according to claim 18, wherein the fulcrum of the bell crank connects to the track carriage suspension mount, the second end of the shock absorber connects to the swing arm suspension mount, and the second end of the connecting rod is configured for connection to the land vehicle frame.

24. The conversion kit according to claim 18, wherein the fulcrum of the bell crank connects to the track carriage suspension mount, the second end of the connecting rod connects to the swing arm suspension mount, and the second end of the shock absorber is configured for connection to the land vehicle frame.

25. The conversion kit according to claim 8, further comprising a snow compacting ramp attached to the track carriage, the ramp positioned forward of the track and inclined upward away from the track.

26. The conversion kit according to claim 25, wherein the ramp is pivotally attached to the track carriage and the angle of incline between the ramp and the track carriage may vary.

27. The conversion kit according to claim 25, wherein the ramp has a forward end movably supported by the frame, the ramp simultaneously pivotable and translatable relative to the frame.

28. The conversion kit according to claim 8, wherein the drive wheel has an axis of rotation displaced 100 millimeters or less from a pivot axis of the track carriage to the swing arm.

29. A conversion kit for converting a two-wheeled land vehicle for use as a snow vehicle by removing the wheels and other non-essential components from the land vehicle and mounting the conversion kit assemblies to the land vehicle, the land vehicle comprising a frame and an elongated steering member operative about a steering axis, the conversion kit assemblies comprising:
 a swing arm having an upper end and a lower end, the upper end of the swing arm configured for pivotal connection to the land vehicle frame;
 a track carriage pivotally mounted to the lower end of the swing arm;
 an endless loop track having a lower run beneath the track carriage and an upper run; the track carriage bearing upon the lower run of the track;
 a drive wheel drivingly coupled to the track; and
 a track suspension comprising a shock absorber, a connecting rod, and a bell crank, the bell crank having a fulcrum, a first arm and a second arm, the bell crank fulcrum attached to the swing arm, the connecting rod pivotally connected between the bell crank second arm and the track carriage, and the shock absorber having a first end pivotally connected to the bell crank first arm and a second end configured for pivotal connection to the land vehicle frame.

30. A conversion kit for converting a motorcycle for use as a snow vehicle by removing the wheels and other non-essential components from the motorcycle and mounting the conversion kit assemblies to the motorcycle, the motorcycle having a frame, an engine, and an elongated steering member operative to rotate about a steering axis, the conversion kit assemblies comprising:
 a track carriage with a front and a rear, the track carriage having at least one rotatable drive wheel coupled to the motor and at least one rotatable guide wheel, the drive wheel positioned at the rear of the track carriage and the guide wheel positioned at the front of the track carriage;
 a swing arm having a forward end and a rearward end, the forward end configured for pivotal connection to the motorcycle frame and the rearward end pivotally connected to the rear of the track carriage;
 a track suspension comprising a shock absorber and a bell crank, the track suspension connected to the track carriage and configured for pivotal connection to the motorcycle frame, the track suspension operative between the motorcycle frame and the track carriage to cushionably support the motorcycle frame upon the track carriage, the track suspension allowing the swing arm to swing vertically around the pivotal connection of the swing arm to motorcycle frame and the track carriage to move in a scissors fashion under the swing arm; and
 an endless loop track wrapping the guide wheel and the drive wheel, the track supported on the track carriage for rotation thereabout at the urging of the drive wheel.

31. A conversion kit according to claim 30, further comprising a ski mounting frame having an upper portion configured for attachment to the elongated steering member and a lower portion mounting a ski.

32. The conversion kit according to claim 30, further comprising a snow compacting ramp attached to the track carriage, the ramp positioned forward of the track and inclined upward away from the track.

33. The conversion kit according to claim 30, further comprising a connecting link having a first end and a second end;
 the bell crank comprising a fulcrum, a first arm and a second arm;
 the shock absorber comprising a first end pivotally attached to the first arm of the bell crank and a second end;
 the connecting link first end pivotally attached to the second arm of the bell crank;
 two members of the set comprising the bell crank fulcrum, the second end of the shock absorber, and the second end of the connecting link each exclusively pivotally connected to one of the track carriage or the swing arm, and the remaining member of the set configured for pivotal connection to the land vehicle frame.

34. A conversion kit for converting a two-wheeled land vehicle for use as a snow vehicle by removing the wheels and other non-essential components from the land vehicle and mounting the conversion kit assemblies to the land vehicle, the land vehicle having a frame, an engine, and an elongated steering member operative to rotate about a steering axis, the conversion kit assemblies comprising:
 a track carriage having at least one rotatable drive wheel coupled to the motor and at least one rotatable guide wheel;
 a swing arm having a forward end and a rearward end, the forward end configured for pivotal connection to the land vehicle frame and the rearward end pivotally connected to the track carriage;
 a track suspension comprising a resilient cushion and a bell crank lever, the resilient cushion operative between the land vehicle frame and the swing arm to urge the swing arm rotatingly downward around the pivotal connection of the swing arm to the land vehicle frame, the bell crank lever pivotally connected between the swing arm and the track carriage operative to urge the track carriage rotatingly downward around the pivotal connection of the track carriage to the swing arm; and
 an endless loop track wrapping the guide wheel and the drive wheel, the track supported on the track carriage for rotation thereabout at the urging of the drive wheel.

* * * * *